United States Patent
Chen et al.

(10) Patent No.: US 12,063,111 B2
(45) Date of Patent: *Aug. 13, 2024

(54) ENHANCING THE ROBUSTNESS OF UPLINK TRANSMISSION

(71) Applicant: AT&T Intellectual Property I, L.P., Atlanta, GA (US)

(72) Inventors: Ye Chen, Milton, GA (US); Arthur Brisebois, Cumming, GA (US); Hongyan Lei, Plano, TX (US); Wen Yang, Bellevue, WA (US); Yakun Gao, Suwanee, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 15 days.

This patent is subject to a terminal disclaimer.

(21) Appl. No.: 17/659,568

(22) Filed: Apr. 18, 2022

(65) Prior Publication Data
US 2022/0239403 A1    Jul. 28, 2022

Related U.S. Application Data

(63) Continuation of application No. 16/510,589, filed on Jul. 12, 2019, now Pat. No. 11,336,392.

(51) Int. Cl.
*H04L 1/00* (2006.01)
*H04L 1/08* (2006.01)
(Continued)

(52) U.S. Cl.
CPC ............ *H04L 1/003* (2013.01); *H04L 1/0003* (2013.01); *H04L 1/0004* (2013.01);
(Continued)

(58) Field of Classification Search
CPC ....... H04L 1/003; H04L 1/0004; H04L 1/001; H04L 1/0009; H04L 1/08; H04L 1/16;
(Continued)

(56) References Cited

U.S. PATENT DOCUMENTS 6,963,752 B1    11/2005  Nilsson
11,336,392 B2 *  5/2022  Chen .................... H04L 1/0009
(Continued)

FOREIGN PATENT DOCUMENTS

CN    109842466 A    6/2019

OTHER PUBLICATIONS

Non Final office action received for U.S. Appl. No. 16/510,589 dated Nov. 24, 2020, 25 pages.
(Continued)

*Primary Examiner* — Omar J Ghowrwal
(74) *Attorney, Agent, or Firm* — Guntin & Gust, PLC; Miyoung Shin

(57) ABSTRACT

Techniques for controlling parameters for uplink transmission associated with a device to facilitate improving a communication condition metric(s) (CCM(s)) of the uplink transmission are presented. A communication management component (CMC) can determine whether CCM satisfies a first threshold CCM. If CCM does not, CMC can modify a parameter(s) to reduce a number of resource blocks or an MCS value to improve the CCM. If respective minimum threshold levels have been reached for the number of resource blocks and MCS value, and CCM still is not satisfying the first threshold CCM, CMC can modify a parameter to increase an amount of repetition of data packets for uplink transmission (unless a maximum threshold amount of repetition is reached). If CCM satisfies an applicable threshold CCM for a defined amount of time, CMC can modify parameters to increase the number of resource blocks, increase MCS value, or reduce repetition of data packets.

20 Claims, 10 Drawing Sheets

(51) Int. Cl.
  *H04L 1/16* (2023.01)
  *H04L 1/1607* (2023.01)
  *H04L 1/1829* (2023.01)
  *H04L 1/1867* (2023.01)
  *H04W 24/02* (2009.01)

(52) U.S. Cl.
  CPC ............ *H04L 1/0009* (2013.01); *H04L 1/001* (2013.01); *H04L 1/08* (2013.01); *H04L 1/16* (2013.01); *H04L 1/1671* (2013.01); *H04L 1/1858* (2013.01); *H04W 24/02* (2013.01)

(58) Field of Classification Search
  CPC ..... H04L 1/1671; H04L 1/1858; H04L 1/189; H04L 1/0003; H04W 24/02
  See application file for complete search history.

(56) References Cited

U.S. PATENT DOCUMENTS

| | | | |
|---|---|---|---|
| 2011/0281614 A1 | 11/2011 | Kitahara | |
| 2013/0294280 A1 | 11/2013 | Xu et al. | |
| 2015/0208453 A1 | 7/2015 | Yamazaki et al. | |
| 2015/0249998 A1 | 9/2015 | Long et al. | |
| 2017/0041923 A1 | 2/2017 | Park | |
| 2017/0257184 A1* | 9/2017 | Stirling-Gallacher | H04L 1/0026 |
| 2018/0035406 A1 | 2/2018 | Hao et al. | |
| 2018/0139699 A1 | 5/2018 | Choi et al. | |
| 2018/0337752 A1 | 11/2018 | Choi et al. | |
| 2018/0352584 A1 | 12/2018 | Hassan | |
| 2020/0112853 A1 | 4/2020 | Jiang et al. | |
| 2020/0127721 A1 | 4/2020 | Li et al. | |
| 2020/0145084 A1 | 5/2020 | Yan et al. | |
| 2020/0288394 A1 | 9/2020 | Chhabra et al. | |

OTHER PUBLICATIONS

LTE Physical Layer Overview Keysight Technologies, Inc. [http://rfmw.em.keysight.com/wireless/helpfiles/89600B/WebHelp/Subsystems/lte/contenl/lte_overview.htm], Copyright 2000-2020, retreived Mar. 26, 2020, 12 pages.

Whyley, G., "AIRCOM LTE Webinar 2—Air Interface" AIRCOM International [https://www.slideshare.net/AIRCOMmarketing/aircom-lte-webinar-series-lte-air-interface], Published on Nov. 4, 2013, retrieved Nov. 23, 2020, 83 pages.

Kriara, L., "Holistic and Efficient Link Adaptation for 802.11x Wireless LANs" Thesis for Doctor of Philosophy, Institute of Computing Systems Architecture School of Informatics, University of Edinburgh, 2014, 137 pages.

Final office action received for U.S. Appl. No. 16/510,589 dated Mar. 10, 2021, 24 pages.

Non-Final office action received for U.S. Appl. No. 16/510,589 dated Sep. 9, 2021, 18 Pages.

Notice of Allowance received for U.S. Appl. No. 16/510,589 dated Jan. 18, 2022, 41 Pages.

* cited by examiner

ENHANCING THE ROBUSTNESS OF UPLINK TRANSMISSION

RELATED APPLICATION

The subject patent application is a continuation of, and claims priority to, U.S. patent application Ser. No. 16/510,589, filed Jul. 12, 2019, and entitled "ENHANCING THE ROBUSTNESS OF UPLINK TRANSMISSION," the entirety of which application is hereby incorporated by reference herein.

TECHNICAL FIELD

The subject disclosure relates generally to wireless communications, e.g., to enhancing the robustness of uplink transmission.

BACKGROUND

Communication devices can communicate data to other communication devices via a communication network. For example, a wireless device (e.g., mobile, cell, or smart phone; or electronic tablet or pad) can connect to and communicate with a wireless communication network (e.g., core network), via a base station associated with the wireless communication network, to communicate with another communication device connected to the wireless communication network or to another communication network (e.g., Internet Protocol (IP)-based network, such as the Internet) associated with (e.g., communicatively connected to) the wireless communication network. The wireless device can, for instance, communicate information to a base station and associated wireless communication network (e.g., core network) via an uplink and can receive information from the base station (and associated wireless communication network) via a downlink.

The above-described description is merely intended to provide a contextual overview relating to wireless communication, and is not intended to be exhaustive.

BRIEF DESCRIPTION OF THE DRAWINGS

Various non-limiting embodiments are further described with reference to the accompanying drawings in which.

DETAILED DESCRIPTION

Figure 1:
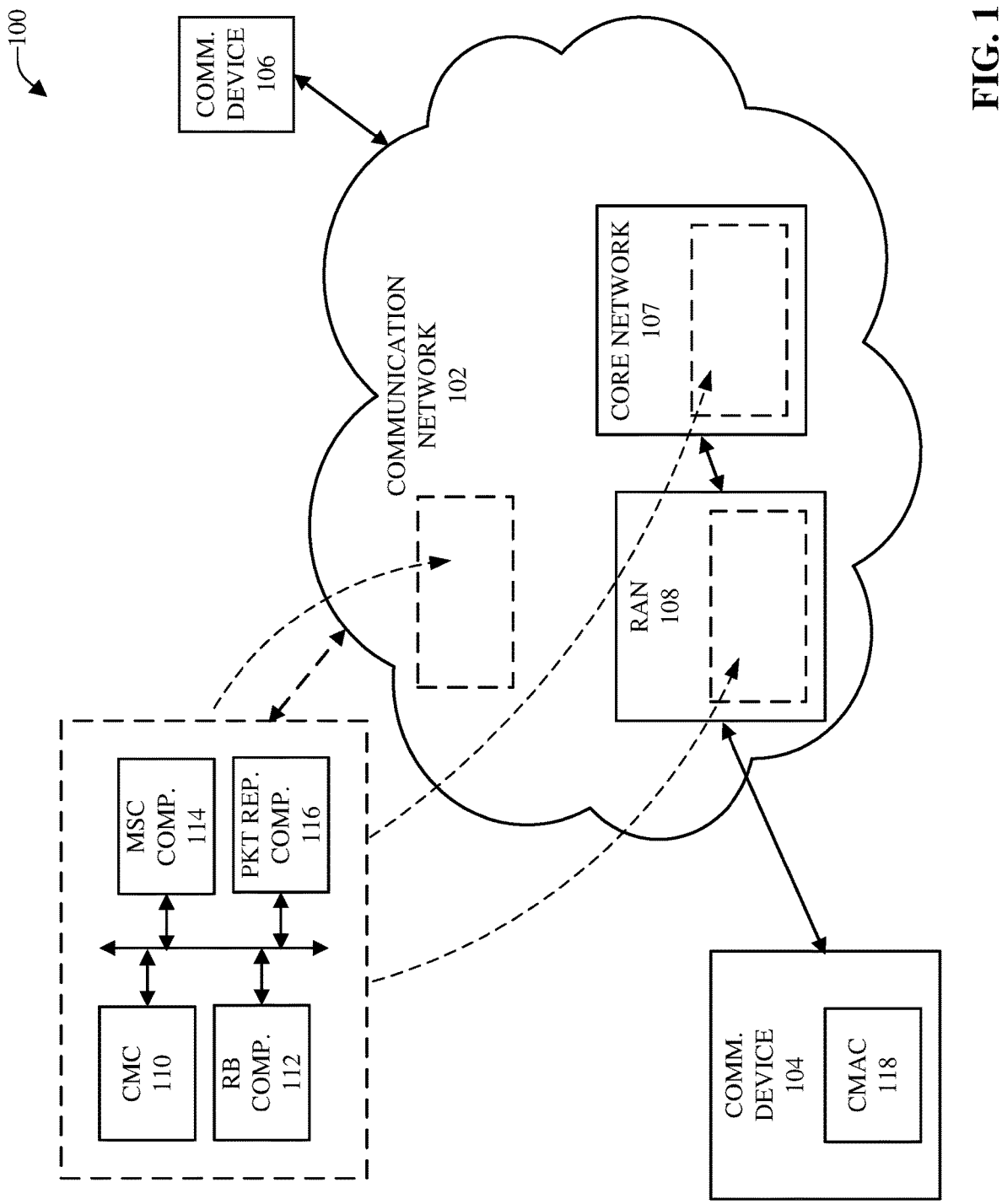
FIG. 1 depicts a block diagram of an example, non-limiting system that can control a group of parameters associated with an uplink transmission of a communication device associated with a communication network to facilitate improving communication condition metrics and robustness of the uplink transmission of the communication device, in accordance with various aspects and embodiments of the disclosed subject matter.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular network environment or standard).

Discussed herein are various aspects that relate to controlling a group of parameters (e.g., resource block parameter, modulation and coding scheme (MCS) parameter, packet repetition parameter, and/or another desired parameter) for an uplink transmission associated with a communication device (e.g., wireless communication device) to facilitate enhancing (e.g., improving) the robustness of the uplink transmission. The disclosed subject matter can significantly improve communication of information between wireless communication devices and a communication network (e.g., wireless communication network) and network efficiency associated with the communication network.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), WI-FI, Worldwide Interoperability for Microwave Access (WIMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), ZIGBEE, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), WI-FI, Wireless Local Area Network (WLAN), WIMAX, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can be a multiple with a factor of $N_t$ over single antenna systems in a rich scattering environment.

Communication devices can communicate information (e.g., voice and/or data traffic) to other communication devices via a communication network, which can comprise a core network that can operate to enable wireless communication between communication devices. For example, a wireless phone (e.g., mobile, cell, or smart phone; or electronic tablet or pad) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network.

In wireless communications, it can be desirable (e.g., important) for the uplink transmission from the communication device to the base station to be sufficiently robust, for example, to maintain a desirable wireless radio link between the communication device and base station and to mitigate and/or avoid failure of the radio link. For example, with regard to 5G NR, the uplink transmission at least will carry (e.g., communicate) the negative acknowledgement message or acknowledgement message (NACK/ACK) for traffic (e.g., voice or data traffic) communicated via the downlink transmission (e.g., NR DL). The uplink transmission also can carry data traffic, for example, when EN-DC (Evolved-Universal Terrestrial Radio Access-New Radio (EUTRA-NR) dual connectivity) technology is employed, wherein EN-DC can enable and allow the communication device to exchange data between the communication device and an NR base station while the communication device also is simultaneously connected with an LTE base station. Sufficient robustness of the uplink (e.g., NR UL) can be desirable in order to achieve desirable (e.g., suitable, acceptable, or optimal) network performance (e.g., NR performance). Sufficient robustness of the uplink can be particularly desirable (e.g., important) for 5G NR mmWave (e.g., time division duplex (TDD) mmWave 5G NR). Generally, it is expected that the 5G NR uplink can be the bottleneck (e.g., the weaker link), in particular for mmWave. There also can be issues (e.g., problems) with the uplink with regard to other types of 5G NR technologies, such as, for example, sub-6 5G NR (e.g., frequency division duplex (FDD) sub-6 5G NR), in addition to mmWave.

From experimental field testing, it has been observed that 5G NR uplink (e.g., physical uplink control channel (PUCCH)) can be a bottleneck (e.g., a relatively weaker link) that can undesirably limit the NR performance. For example, at the edge of NR coverage (e.g., based on a DL NR reference signal received power (RSRP) −90 dBm threshold), radio link failure of the uplink has been observed due to a weak uplink. Another observation is that poor uplink NACK/ACK reception (e.g., loss of ACK sent by UE to the base station) can lead to an implicit NACK (e.g., base station assumes downlink transmission was not received because an ACK regarding the downlink transmission was not received by the base station), unnecessary downlink packet retransmission, and reduction of downlink throughput, capacity, and reliability.

The disclosed subject matter can overcome these and other problems associated with wireless communications. To that end, the disclosed subject matter presents techniques, methods, and systems that can control a group of parameters (e.g., communication parameters, such as uplink and/or resource parameters) for an uplink transmission associated with a device to facilitate improving communication condition metrics (e.g., communication quality metrics), including a signal-to-interference-plus-noise ratio (SINR) and/or the implicit NACK rate, of the uplink transmission. The disclosed subject matter can comprise a communication management component (CMC) that can determine whether one or more communication condition metrics (e.g., SINR, implicit NACK rate, and/or another type of communication condition metric) satisfies one or more respective first threshold values relating to the one or more communication condition metrics (e.g., a first threshold SINR, and/or a first threshold implicit NACK rate), based at least in part on the results of analyzing communication-related conditions, including the SINR and implicit NACK rate, of the uplink communication connection between the device (e.g., communication device) and the communication network.

If the CMC determines that a communication condition metric(s) does not satisfy the first threshold value(s) relating to such communication condition metric(s), the CMC can modify one or more parameters of the group of parameters to improve, or at least attempt to improve, the communication condition metric(s) (e.g., SINR and/or implicit NACK rate), and enhance the robustness, of the uplink transmission. The group of parameters can comprise, for example, a resource block parameter relating to the number of resource blocks (e.g., physical resource blocks (PRBs) utilized for the uplink transmission, a modulation and coding scheme (MCS) parameter relating to an MCS value utilized for the uplink transmission, a packet repetition parameter relating to an amount of repetition of data packets for the uplink transmission, and/or another desired parameter relating to communication conditions associated with the uplink transmission. For example, in response to determining that a communication condition metric, such as the SINR or implicit NACK rate, does not satisfy the first threshold value relating to such communication condition metric, to improve, or at least attempt to improve, the communication condition metric (e.g., the SINR or implicit NACK rate), the CMC can modify one or more parameters of the group of parameters to reduce the number of resource blocks utilized for the uplink transmission by a desired amount of resource blocks and/or reduce the MCS value for the uplink transmission by a desired amount, unless the CMC determines that the respective minimum threshold levels have been satisfied (e.g., reached) with respect to the number of resource blocks and MCS value, in accordance with defined communication management criteria.

In some embodiments, the CMC can determine that the resource block parameter and the MCS value parameter are to be modified at the same time in a given step to reduce the number of resource blocks and reduce the MCS value. Alternatively, as desired, the CMC can determine that those parameters (e.g., resource block parameter and MCS parameter) are to be modified separately (e.g., in separate steps), wherein the CMC can reduce one of those parameters (e.g., resource block parameter) in a first step to reduce the number of resource blocks and can reduce the other parameter (e.g., MCS value) in a second step to reduce the MCS value. Alternatively, the CMC can determine that first parameter (e.g., resource block parameter) of those parameters is to be modified (e.g., reduced), without modifying (e.g., reducing) a second parameter (e.g., MCS parameter) of those parameters, until the first parameter has been modified to the point of satisfying the applicable threshold value associated with the first parameter, and thereafter, as desired (e.g., as needed to achieve the desired SINR and/or implicit NACK rate of the uplink transmission), the CMC can modify the second parameter to attempt to improve (e.g., further improve) the communication condition metric.

If the CMC determines that the respective minimum threshold levels have been satisfied for the number of resource blocks and MCS value, and determines that the communication condition metric (e.g., the SINR or implicit NACK rate) for the uplink transmission still is not satisfying the first threshold value, the CMC can modify the packet repetition parameter to increase an amount of repetition of data packets for the uplink transmission by a desired amount, unless a defined maximum threshold amount of repetition of data packets has been reached, in accordance with the defined communication management criteria.

After modifying the one or more parameters of the group of parameters, the CMC can determine the communication condition metrics (e.g., current SINR, current implicit NACK rate, and/or another current communication condition metric) for the uplink transmission, with the modified parameter values in place, based at least in part on the results of analyzing of information relating to the communication-related conditions, including SINR, implicit NACK rate, etc., of the uplink communication connection. The CMC can determine whether one or more of the respective communication condition metrics (e.g., the SINR and/or implicit NACK rate) satisfy one or more of the respective first threshold values relating to the respective communication condition metrics. If the CMC determines that the one or more respective communication condition metrics do satisfy the one or more respective first threshold values relating to the one or more respective communication condition metrics, the CMC can determine that the group of parameters does not have to be modified. With regard to one or more the communication condition metrics, for each communication condition metric (e.g., SINR or implicit NACK rate) under consideration, if the CMC determines that the communication condition metric still does not satisfy the first threshold value relating to such communication condition metric, the CMC can determine whether further modifications of one or more parameters of the group of parameters are to be performed to attempt to improve communication condition metric (e.g., the SINR or implicit NACK rate) of the uplink transmission, and, if so, can implement such modifications of the one or more parameters, in accordance with the defined communication management criteria, including the respective threshold values associated with the respective parameters of the group of parameters.

The CMC also can modify the parameters, for example, to increase the number of resource blocks, increase the MCS value, and/or decrease the amount of repetition of data packets for the uplink transmission, if the CMC determines that a communication condition metric(s) (e.g., the SINR or implicit NACK rate) of the uplink transmission is sufficiently good for a desired amount of time. For instance, if the CMC determines that a communication condition metric(s) (e.g., the SINR or implicit NACK rate) satisfies an applicable threshold value(s) relating to such communication condition metric(s) for a defined amount of time, the CMC can modify one or more of the parameters to increase the number of resource blocks, increase MCS value, and/or reduce the amount of repetition of data packets, in accordance with the defined communication management criteria. In accordance with various embodiments, with regard to a particular communication condition metric, the applicable threshold value can be the first threshold value relating to that particular communication condition metric or a second (e.g., different) threshold value relating to that particular communication condition metric, in accordance with the defined communication management criteria.

With further regard to the repetition of data packets, in some embodiments, the CMC can associate, add, or apply a tag to data packets (e.g., repetitive data packets) of a message (e.g., an ACK message or a NACK message) carried in the uplink transmission, wherein the tag can indicate to which downlink transmission the message repetition (e.g., packet repetition of an ACK or NACK message) applies or is related. For instance, for ACK and NACK messages on PUCCH, there sometimes can be a time limitation, such as an n+x time slot, for the communication of such messages, wherein n and x can be respective number values. For the repetition of the data packets of the message to be recognized by the receiver (e.g., base station, or communication network) of the message, the CMC can associate, add, or apply the tag to the data packets (e.g., repetitive data packets) of the message to indicate the downlink transmission (e.g., the data in the downlink message) to which the uplink message repetition (e.g., ACK or NACK message repetition) applies or relates.

These and other aspects and embodiments of the disclosed subject matter will now be described with respect to the drawings.

FIG. 1 depicts a block diagram of an example, non-limiting system 100 that can control a group of parameters associated with an uplink transmission of a communication device associated with a communication network to facilitate improving communication condition metrics (e.g., communication quality metrics, such as a SINR or implicit NACK rate) and robustness of the uplink transmission of the communication device, in accordance with various aspects and embodiments of the disclosed subject matter. The system 100 can comprise a communication network 102 that can facilitate (e.g., enable) communication of information (e.g., voice and/or data traffic) between communication devices (e.g., user equipment (UE)), including communication device 104 (COMM. DEVICE 104) and communication device 106 (COMM. DEVICE 106), associated with (e.g., communicatively connected to) the communication network 102, and/or between a communication device (e.g., 104) and the communication network 102.

The communication network 102 can comprise a core network that can operate to enable wireless communication between communication devices (e.g., between communication device 104 and communication device 106) and/or between a communication device (e.g., 104) and the communication network 102. The communication network 102 can comprise various components, such as network (NW) nodes e.g., radio network nodes) that can be part of the communication network 102 to facilitate communication of information between devices (e.g., communication devices 104 and 106) that can be associated with (e.g., communicatively connected to) the communication network 102. In some embodiments, the communication network 102 can employ MIMO technology to facilitate data communications between devices (e.g., network devices, communication devices, . . . ) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices (e.g., 104, 106, . . . ) and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the communication network 102.

A communication device (e.g., 104, 106, . . . ) also can be referred to as, for example, a device, a mobile device, or a mobile communication device. The term "communication device" can be interchangeable with (or include) a UE or other terminology. A communication device (or UE, device, . . . ) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, . . . ), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic eyeglasses, headwear, or bodywear having wireless communication functionality), a music or media player, speakers (e.g., powered speakers having wireless communication functionality), an appliance (e.g., a toaster, a coffee maker, a refrigerator, or an oven, . . . , having wireless communication functionality), a device associated or integrated with a vehicle (e.g., automobile, airplane, bus, train, or ship, . . . ), a drone, a home or building automation device (e.g., security device, climate control device, lighting control device, . . . ), an industrial or manufacturing related device, and/or any other type of communication devices (e.g., other types of IoTs).

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

In accordance with various embodiments, the communication network 102 can be or can comprise a core network 107, which can be or can comprise a 2G, 3G, 4G, 5G, or other next generation core network. The core network 107 can employ network nodes, network devices, and/or network elements to facilitate wireless communications by communication devices (e.g., communication device 104) associated with (e.g., wirelessly connected to) the core network 107. The core network 107 can include a radio access network (RAN) 108 that can comprise a set of cells (not shown in FIG. 1), wherein respective cells can be associated with respective base stations of the RAN 108. For example, the RAN 108 can comprise or be associated with a set of base stations that can serve communication devices (e.g., communication device 104) located in respective coverage areas served by respective base stations in the communication network 102. In some embodiments, the RAN 108 can be a cloud-RAN (C-RAN) that can be located in or associated with a cloud computing environment, comprising various cloud network components of the communication network 102. The respective cells of the set of cells can have respective coverage areas that can form the coverage area covered by one or more sectors of the communication network 102. The respective communication devices (e.g., communication device 104) can be communicatively connected to the communication network 102 via respective wireless communication connections with one or more of the respective cells. For example, communication device 104 can be connected to the communication network 102 via a first cell of the RAN 108, and another communication device can be connected to the communication network 102 via the first cell or a second cell of the RAN 108 or another RAN of the communication network 102.

With regard to 5G or other next generation networks, in accordance with various embodiments, the core network 107 can be or can comprise a 5G NR mmWave network or a sub-6 5G NR network, wherein the network can employ TDD technology or FDD technology. In some embodiments, the core network 107 can employ option 3x where LTE can be the anchor carrier with the control plane and the 5G NR can be a secondary leg for the data plane.

In wireless communications, it can be desirable (e.g., important) for the uplink transmission from the communication device to the base station to be sufficiently robust, for example, to maintain a desirable wireless radio link between the communication device and base station and to mitigate and/or avoid failure of the radio link. For example, with regard to 5G NR, the uplink transmission at least will carry (e.g., communicate) the ACK and NACK messages relating to traffic (e.g., voice or data traffic) communicated via the downlink transmission (e.g., NR DL). The uplink transmission also can carry data traffic, for example, when EN-DC technology is employed, wherein EN-DC can enable and allow the communication device to exchange data between the communication device and an NR base station while the communication device also is simultaneously connected with an LTE base station. Sufficient robustness of the uplink (e.g., NR UL) can be desirable in order to achieve desirable (e.g., suitable, acceptable, or optimal) network performance (e.g., NR performance). Sufficient robustness of the uplink can be particularly desirable (e.g., important) for 5G NR mmWave (e.g., TDD mmWave 5G NR). Generally, it is expected that the 5G NR uplink can be the bottleneck (e.g., the weaker link), in particular for mmWave. There also can be issues (e.g., problems) with the uplink with regard to other types of 5G NR technologies, such as, for example, sub-6 5G NR (e.g., FDD sub-6 5G NR), in addition to mmWave.

In accordance with various embodiments, the disclosed subject matter can comprise a communication management component (CMC) 110 that control (e.g., manage, adjust, modify, and/or tune) various parameters of a group of parameters (e.g., communication parameters, such as uplink and/or resource parameters) associated with uplink transmissions of communication devices, such as communication device 104, to facilitate improving (e.g., increasing) one or more communication condition metrics (e.g., communication quality metrics or values), including, for example, the SINR and implicit NACK rate, and improving (e.g., increasing) the robustness, of the uplink transmission to mitigate (e.g., reduce the occurrence or risk of) radio link failure of the uplink transmission. The CMC 110 can control the group of parameters, for example, with regard to the physical uplink control channel (PUCCH) and/or the physical uplink shared channel (PUSCH) associated with the uplink transmissions of communication devices (e.g., communication device 104). The group of parameters can comprise, for example, a resource block parameter relating to a number of resource blocks (e.g., physical resource blocks (PRBs)) utilized during an uplink transmission, an MCS parameter relating to an MCS value (e.g., MCS index value) utilized during the uplink transmission, a packet repetition parameter relating to the amount of repetition of transmission of a particular data packet (e.g., the number of copies of such data packet) that is to be communicated during the uplink transmission, and/or another desired parameter relating to the uplink transmission.

It is to be appreciated and understood that, while various aspects and embodiments of the disclosed subject matter are described herein with regard to determining and using the SINR and implicit NACK rate associated with an uplink transmission of a communication device to control (e.g., by the CMC 110) the group of parameters to improve the robustness of the uplink transmission, while also achieving a desirable efficiency of the uplink transmission, in accordance with the defined communication management criteria, the disclosed subject matter is not so limited. In accordance with various other aspects and embodiments of the disclosed subject matter, alternatively or additionally, the CMC 110 can determine and/or utilize other communication condition metrics or parameters (e.g., a reference signal received power (RSRP) associated with a communication device, a reference signal received quality (RSRQ) associated with the communication device, and/or a channel quality indicator (CQI) associated with the communication device) to control various parameters (e.g., number of resource blocks, MCS value, amount of repetition of data packets, and/or another desired parameter) of the group of parameters associated with uplink transmission of a communication device, such as communication device 104, to facilitate improving the robustness of the uplink transmission to mitigate radio link failure of the uplink transmission, while also achieving a desirable efficiency of the uplink transmission, in accordance with the defined communication management criteria, and the systems, methods, techniques, and/or algorithms of the disclosed subject matter can be modified or extended to utilize such other communication condition metrics or parameters, and such modifications or extensions of the systems, methods, techniques, and/or algorithms of the disclosed subject matter are considered part of the disclosed subject matter.

The system 100 can include a resource block component 112 (RB COMP. 112) that can allocate respective resource blocks (e.g., PRBs) to respective communication devices, such as communication device 104, for example, as respectively controlled by the CMC 110. For instance, the CMC 110 can determine that a certain number of resource blocks is to be allocated to the communication device 104 for uplink transmission, and can communicate, to the resource block component 112, information (e.g., instruction or control information) comprising or indicating a certain resource block parameter associated with (e.g., corresponding to or indicating) the certain number of resource blocks that is to be allocated to the communication device 104 for uplink transmission. Based at least in part on such information, the resource block component 112 can set or select the certain resource block parameter and/or can allocate the certain number of resource blocks to the communication device 104 for uplink transmission and/or can communicate information (e.g., control, scheduling, or allocation information) regarding such certain resource block parameter and/or such allocation of resource blocks to the communication device 104 via a desired communication channel (e.g., a control channel).

The system 100 also can comprise an MCS component 114 (MSC COMP. 114) that can facilitate selecting and implementing an MCS value (e.g., MCS index value) of a set of MCS values, as determined and controlled by the CMC 110. For example, the CMC 110 can determine that a particular MCS value of the set of MCS values is to be utilized by the communication device 104 for uplink transmission, in accordance with the defined communication management criteria, as more fully described herein. The CMC 110 can communicate, to the MCS component 114, information (e.g., instruction or control information) comprising or indicating the particular MCS parameter associated with (e.g., corresponding to or indicating) the particular MCS value that is to be utilized by the communication device 104 for uplink transmission. Based at least in part on such information, the MCS component 114 can select or set the particular MCS parameter and/or associated particular MCS value and/or can communicate, to the communication device 104 via the desired communication channel (e.g., the control channel), information (e.g., control, scheduling, or allocation information) comprising or indicating the particular MCS parameter and/or the particular MCS value that the communication device 104 is to utilize for uplink transmission.

The MCS values (e.g., MCS index values) can relate to the number of spatial streams employed for a data transmission (e.g., uplink transmission), the modulation employed for the data transmission, and/or the coding rate employed for the data transmission. Depending on the MCS value, the modulation can be, for example, binary phase shift keying (BPSK), quadrature phase shift keying (QPSK), 16-quadature amplitude modulation (QAM), 64-QAM, and/or another desired modulation scheme(s). Also, depending on the MCS value, the coding rate can be, for example, ½, ¾, ⅔, ⅚, and/or another desired coding rate. TABLE 1 comprises a listing of some example MCS index values and respectively associated example numbers of spatial streams, modulation schemes, and coding rates.

TABLE 1

| MCS Index | Number of Spatial Streams | Modulation | Coding Rate |
| --- | --- | --- | --- |
| 0 | 1 | BPSK | 1/2 |
| 1 | 1 | QPSK | 1/2 |
| 2 | 1 | QPSK | 3/4 |
| 3 | 1 | 16-QAM | 1/2 |
| 4 | 1 | 16-QAM | 3/4 |
| 5 | 1 | 64-QAM | 2/3 |
| 6 | 1 | 64-QAM | 3/4 |
| 7 | 1 | 64-QAM | 5/6 |
| 8 | 2 | BPSK | 1/2 |
| 9 | 2 | QPSK | 1/2 |
| 10 | 2 | QPSK | 3/4 |
| 11 | 2 | 16-QAM | 1/2 |
| 12 | 2 | 16-QAM | 3/4 |
| 13 | 2 | 64-QAM | 2/3 |
| 14 | 2 | 64-QAM | 3/4 |
| 15 | 2 | 64-QAM | 5/6 |

It is to be appreciated and understood that the MCS index values, number of spatial streams, types of modulation, and coding rates, and the relationships or mappings between the MCS index values, number of spatial streams, types of modulation, and coding rates in TABLE 1 are non-limiting examples. In accordance with various other embodiments, as desired, the MCS index values, number of spatial streams, types of modulation, and coding rates, and the relationships or mappings between the MCS index values, number of spatial streams, types of modulation, and coding rates can be different from those presented in TABLE 1.

The system 100 further can include a packet repetition component 116 (PKT REP. COMP. 116) that can facilitate selecting an amount of repetition of data packets for uplink transmission from communication devices, such as communication device 104, wherein the packet repetition can be managed by the CMC 110, in accordance with the defined communication management criteria, as more fully described herein. For example, in some instances, the CMC 110 can determine that a certain amount of repetition of data packets (or no repetition of data packets) is to be utilized by the communication device 104 for uplink transmission, in accordance with the defined communication management criteria, and the CMC 110 can communicate, to the packet repetition component 116, information (e.g., instruction or control information) comprising or indicating the packet repetition parameter for the certain amount of repetition of data packets (or indicating the packet repetition parameter for no repetition of data packets) that is to be utilized by the communication device 104 for uplink transmission. Based at least in part on such information, the packet repetition component 116 can facilitate selecting or setting the packet repetition parameter to have the certain amount of repetition of data packets (e.g., select or set a certain repetition number) (or can select or set the packet repetition parameter for no repetition of data packets) and/or can communicate, to the communication device 104 via the desired communication channel (e.g., the control channel), information (e.g., control information) comprising or indicating the packet repetition parameter and/or indicating the certain amount of repetition of data packets that the communication device 104 is to utilize for uplink transmission.

In some embodiments, the CMC 110, the resource block component 112, the MCS component 114, and/or the packet repetition component 116 can be located in and/or part of the core network 107 and associated with (e.g., connected to) the RAN 108 of the communication network 102. In other embodiments, the CMC 110, the resource block component 112, the MCS component 114, and/or the packet repetition component 116 can be located in and/or part of another part of the communication network 102 and associated with the RAN 108. In still other embodiments, the CMC 110, the resource block component 112, the MCS component 114, and/or the packet repetition component 116 can be located in and/or part of the RAN 108, or they can be stand-alone components that can be associated with the communication network 102 (e.g., the RAN 108 of the communication network 102).

The CMC 110 can receive communication-related information regarding communication conditions, including SINR and implicit NACK rate, relating to an uplink transmission of an uplink communication connection between the communication device 104 and RAN 108. The CMC 110 can analyze the communication-related information to determine the SINR, the implicit NACK rate, and/or other communication conditions associated with the uplink transmission of the communication device 104. Based at least in part the results of the analysis, the CMC 110 can determine one or more communication condition metrics, including the SINR and/or the implicit NACK rate, of the uplink transmission. The CMC 110 can control (e.g., manage) the group of parameters associated with the uplink transmission for the communication device 104, based at least in part on the results of an analysis (e.g., evaluation or comparison) of one or more of the respective communication condition metrics and one or more respectively applicable threshold values relating to the one or more respective communication condition metrics and/or respective parameters of the group of parameters, in accordance with the defined communication management criteria.

For instance, based at least in part on the results of analyzing (e.g., evaluating or comparing) a communication condition metric (e.g., the SINR or implicit NACK rate) relating to an uplink transmission and a first threshold value (e.g., first threshold SINR or first threshold NACK rate) relating to the communication condition metric of the uplink transmission, the CMC 110 can determine whether the communication condition metric for the uplink transmission satisfies (e.g., meets or exceeds) the first threshold value, in accordance with the defined communication management criteria. The first threshold value can be determined and selected, in accordance with the defined communication management criteria, such that a communication condition metric that satisfies (e.g., meets or exceeds) the first threshold value can be sufficiently robust to provide (e.g., suitably and/or reliably provide) desirable uplink transmission of information (e.g., ACK message, NACK message, and/or user data) from the communication device 104 to the RAN 108. For example, with regard to SINR, the first threshold value relating to SINR can be set at a desired threshold value, such as −2.0 decibels (dB), −1.0 dB, or another desired threshold value (e.g., −3.0 dB, −4.0 dB, or −5.0 dB, . . . ), in accordance with the defined communication management criteria. As another example, with regard to the implicit NACK rate, the first threshold value relating to the implicit NACK rate can be set at a desired threshold value, such as 10.0% or higher than 10.0% (e.g., 10.5%, 11.0%, 12.0%, . . . ), or even lower than 10% (e.g., 9.0%, 9.5%, . . . ), in accordance with the defined communication management criteria. It is to be appreciated and understood that these first threshold values for SINR and the implicit NACK rate are merely non-limiting example threshold values, and, in accordance with various other embodiments, other threshold values for SINR and the implicit NACK rate can be utilized in accordance with the disclosed subject matter.

It is to be appreciated and understood that, for reasons of brevity and clarity, various aspects and embodiments are described herein with regard to a communication condition metric (e.g., a SINR or an implicit NACK rate). However, additionally (e.g., in parallel or simultaneously, or serially, if desired), the CMC 110 can perform the operations described herein (e.g., determining each of the communication condition metrics, analyzing each of the communication condition metrics in relation to the first (or other applicable) threshold value relating to such communication condition metric, controlling parameters of the group of parameters, . . . ) with regard to multiple communication condition metrics (e.g., SINR, implicit NACK rate, and/or another communication condition metric) associated with an uplink transmission in relation to respective first (or other applicable) threshold values relating to the respective communication condition metrics, in accordance with the defined communication management criteria.

If the CMC 110 determines that the communication condition metric satisfies the first threshold value, and if the group of parameters (e.g., resource block parameter, MCS parameter, or packet repetition parameter, . . . ) had not previously been modified to improve (e.g., increase) the communication condition metric of the uplink transmission, the CMC 110 can determine that the group of parameters do not have to be modified. If the group of parameters had previously been modified to improve the communication condition metric (or another communication condition metric) of the uplink transmission, for example, by reducing the number of resource blocks, reducing the MCS value, and/or increasing the amount of repetition of data packets for the uplink transmission, the CMC 110 can determine whether the communication condition metric has satisfied an applicable threshold value for a defined amount of time to facilitate determining whether any parameter(s) of the group of parameters is to be modified (e.g., to increase the number of resource blocks, increase the MCS value, and/or reduce the amount of data packet repetition), wherein the applicable threshold value can be the first threshold value or a second threshold value, whichever is applicable, in accordance with the defined communication management criteria, as more fully described herein.

If, instead, the CMC 110 determines that the communication condition metric for the uplink transmission does not satisfy the first threshold value, the CMC 110 can determine that at least one parameter (e.g., the resource block parameter, the MCS parameter, the packet repetition parameter, and/or another parameter) of the group of parameters is to be modified to facilitate improving the communication condition metric of the uplink transmission. In response to determining that at least one parameter of the group of parameters is to be modified, the CMC 110 can determine whether the number of resource blocks satisfies a defined minimum threshold number of resource blocks and whether the MCS value satisfies a defined minimum threshold MCS value, wherein the respective minimum threshold values for those parameters can be set in accordance with the defined communication management criteria. One communication management criterion can indicate that the respective minimum threshold values for those parameters are to be set to enable the uplink transmission to at least have a desirable (e.g., minimally acceptable) level of efficiency, data rate, and/or other characteristic(s) for the uplink transmission, wherein, in some embodiments, this can be a default communication management criterion for determining and selecting the respective minimum threshold values for those parameters. In other embodiments, in accordance with another communication management criterion, the CMC 110 can modify the respective minimum threshold values for those parameters (e.g., to increase the respective minimum threshold values) based at least in part on one or more other factors, such as, for example, the status of uplink ACK/NACK transmissions (e.g., whether ACK/NACK transmissions are being segmented or buffered), as more fully described herein.

If the CMC 110 determines that the number of resource blocks does not satisfy (e.g., does not meet or exceed) the defined minimum threshold number of resource blocks and/or the MCS value does not satisfy the defined minimum threshold MCS value, the CMC 110 can modify (e.g., reduce) the resource block parameter to reduce the number of resource blocks by a desired number of resource blocks (e.g., two resource blocks, four resource blocks, or another desired number), such that the number of resource blocks will not be reduced below the defined minimum threshold number of resource blocks, and/or can modify (e.g., reduce) the MCS parameter to reduce the MCS value by a defined number (e.g., reduce the MCS value by two, four, or another desired number), such that the MCS value will not be reduced below the defined minimum threshold MCS value. In some embodiments, the CMC 110 can adaptively determine and/or modify the step size (e.g., increase or decrease step size) of reduction of the number of resource blocks and/or the step size of the reduction of the MCS value based at least in part on the relative proximity of the SINR to first threshold value, in accordance with the defined communication criteria, as more fully described herein.

In accordance with various embodiments, the CMC 110 can determine that the resource block parameter is to be modified to reduce the number of resource blocks for the uplink transmission, without modifying the MCS parameter to reduce the MCS value for the uplink transmission; or the CMC 110 can determine that the MCS parameter is to be modified to reduce the MCS value for the uplink transmission, without modifying the resource block parameter to reduce the number of resource blocks for the uplink transmission; or the CMC 110 can determine that the resource block parameter is to be modified to reduce the number of resource blocks and the MCS parameter is to be modified to reduce the MCS value for the uplink transmission, in accordance with (e.g., as specified by) the defined communication management criteria.

After modifying the resource block parameter and/or the MCS parameter, the CMC 110 can continue to monitor the communication-related conditions (e.g., the SINR, implicit NACK rate, and/or other conditions) associated with the uplink transmission to facilitate determining whether adjustments (e.g., further adjustments) are to be made to any of the parameters of the group of parameters to facilitate improving the communication condition metric (e.g., SINR or implicit NACK rate), and, consequently, the robustness of the uplink transmission associated with the communication device 104. If the CMC 110 determines that the communication condition metric satisfies the first threshold value relating to the communication condition metric, the CMC 110 can determine that modification (e.g., further modification) of the resource block parameter and the MCS parameter is not to be performed at that time, wherein the monitoring of the communication-related conditions can continue to determine whether the communication condition metric continues to satisfy the first threshold value, or satisfies the applicable threshold value (which can be the first threshold value or the second threshold value) for at least the defined amount of time, as more fully described herein.

If, however, the number of resource blocks is determined to be at the defined minimum threshold number of resource blocks, the CMC 110 can determine that the number of resource blocks cannot be reduced any further, and thus, the resource block parameter cannot be modified (e.g., reduced) any further to reduce the number of resource blocks. If the MCS value is determined to be at the defined minimum threshold MCS value, the CMC 110 can determine that the MCS value cannot be reduced any further, and thus, the MCS parameter cannot be modified (e.g., reduced) any further to reduce the MCS value.

If the resource block parameter and MCS parameter are not able to be modified (e.g., reduced) to reduce the number of resource blocks or reduce the MCS value, the CMC 110 can evaluate the amount of repetition of data packets (if any repetition) for the uplink transmission associated with the communication device 104 to determine whether the packet repetition parameter is able to be modified (e.g., increased) to increase the amount of repetition of data packets (e.g., ACK data packet, NACK data packet, and/or packet of user data) via the uplink transmission to facilitate improving (e.g., enhancing or increasing) the communication condition metric (e.g., SINR or implicit NACK rate), and consequently, the robustness, of the uplink transmission, in accordance with the defined communication management criteria. For instance, the CMC 110 can compare the amount of repetition of data packets (if any data packet repetition) for the uplink transmission to a defined maximum threshold amount of repetition of data packets for the uplink transmission to determine whether the amount of repetition of data packets satisfies (e.g., meets or is the same as) the defined maximum threshold amount of repetition of data packets. Typically, if there has been no repetition of data packets performed for the uplink transmission, the CMC 110 can modify the packet repetition parameter to increase the amount of repetition of data packets for the uplink transmission (e.g., increase the number of copies of a particular data packet to be communicated from the device 104 during the uplink transmission), as the defined maximum threshold amount of repetition of data packets typically will not be satisfied under such circumstances.

If the CMC 110 determines that the amount of repetition of data packets satisfies the defined maximum threshold amount of repetition of data packets, the CMC 110 can determine that the packet repetition parameter is not able to be modified to increase the amount of repetition of data packets for the uplink transmission, since the amount of repetition of data packets for the uplink transmission is already at the maximum amount of repetition of data packets permitted, in accordance with the defined communication management criteria. If, however, the CMC 110 determines that the amount of repetition of data packets for the uplink transmission does not satisfy (e.g., is not at) the defined maximum threshold amount of repetition of data packets for the uplink transmission, the CMC 110 can determine that the packet repetition parameter can be modified to increase the amount of repetition of data packets for the uplink transmission by a defined amount (e.g., increase repetition of a data packet by one, two, or another desired number of data packets), in accordance with the defined communication management criteria. Accordingly, the CMC 110 can modify the packet repetition parameter to increase the amount of repetition of data packets for the uplink transmission by the defined amount of data packets.

For example, the CMC 110 can determine that the amount of repetition of data packets for the uplink transmission can be increased by one data packet. That is, with respect to a data packet, if there had been one copy of a data packet being communicated from the communication device 104 during uplink transmission (such that there is no repetition), the CMC 110 can modify the packet repetition parameter to increase the number of copies of the data packet by a desired amount, such as one (at least initially), such that the communication device 104 can communicate two copies of the data packet during the uplink transmission.

After modifying the packet repetition parameter, the CMC 110 can continue to monitor the communication-related conditions (e.g., the SINR, implicit NACK rate, and/or other communication-related conditions) associated with the uplink transmission for the device 104 to facilitate determining whether adjustments (e.g., further adjustments) are to be made to the packet repetition parameter or any of the other parameters of the group of parameters to facilitate improving (e.g., enhancing or increasing) the communication condition metric (e.g., SINR, implicit NACK rate, and/or other communication condition metric), and, consequently, the robustness of the uplink transmission associated with the communication device 104. If analysis of communication-related data relating to the communication-related conditions associated with the uplink transmission indicates that the communication condition metric is still not satisfying the first threshold value relating to that communication condition metric, the CMC 110 can continue (e.g., iteratively continue) to modify the packet repetition parameter to further increase the amount of repetition of data packets for the uplink transmission either until the communication condition metric satisfies the first threshold value or until the defined maximum threshold amount of repetition of data packets has been satisfied (e.g., reached). If the CMC 110 determines that the communication condition metric has satisfied the first threshold value, or determines that the defined maximum threshold amount of repetition of data packets has been satisfied, the CMC 110 can determine that the amount of repetition of data packets for the uplink transmission is not to be increased any further at this time.

As disclosed, the CMC 110 can continue to monitor the communication-related conditions (e.g., SINR, implicit NACK rate, and/or other communication-related conditions) associated with the uplink transmission for the device 104. If the CMC 110 determines that a communication condition metric (e.g., SINR or implicit NACK rate) associated with the uplink transmission has satisfied the applicable threshold value relating to such communication condition metric for at least the defined amount of time, the CMC 110 can determine that one or more of the parameters of the group of parameters are to be modified to improve the efficiency of the uplink transmission while still maintaining a desirable communication condition metric value (e.g., SINR) and/or another desired communication condition metric value (e.g., implicit NACK rate), in accordance with the defined communication management criteria. For instance, if there has been no repetition of data packets performed (or if repetition of data packets has been ceased or removed), and if the CMC 110 determines that the communication condition metric associated with the uplink transmission has satisfied the applicable threshold value for at least the defined amount of time, the CMC 110 can determine that the resource block parameter is to be modified (e.g., increased) to increase the number of resource blocks by a desired amount (e.g., increase the number of resource blocks by two, four, or other desired number of resource blocks) for the uplink transmission and/or the MCS parameter is to be modified (e.g., increased) to increase the MCS value (e.g., increase the MCS value by two, four, or other desired number) for the uplink transmission.

If data packet repetition has been performed for the uplink transmission, and if the CMC 110 determines that the communication condition metric associated with the uplink transmission has satisfied the applicable threshold value for at least the defined amount of time, the CMC 110 can determine that the packet repetition parameter is to be modified (e.g., decreased) to decrease the amount of repetition of data packets by a desired amount (e.g., one data packet copy) for the uplink transmission (e.g., to reduce the number of copies of a particular data packet to be communicated via the uplink transmission). The CMC 110 can continue to monitor the communication-related conditions and can make further modifications to one or more of the parameters (e.g., to increase the number of resource blocks, to increase the MCS value, or to decrease the amount of repetition of data packets), for example, if the communication condition metric is determined to satisfy (e.g., continues to satisfy) the applicable threshold value for a defined amount of time (e.g., another defined amount of time, since the last parameter modification), in accordance with the defined communication management criteria.

With further regard to the repetition of data packets, in some embodiments, the CMC 110 can associate, add, or apply a tag to data packets (e.g., repetitive data packets) of a message (e.g., an ACK message or a NACK message) carried in the uplink transmission, wherein the tag can indicate to which downlink transmission the message repetition (e.g., packet repetition of an ACK or NACK message) applies or is related. For instance, for ACK and NACK messages on PUCCH, there sometimes can be a time limitation, such as an n+x time slot, for the communication of such messages, wherein n and x can be respective number values. For the repetition of the data packets of the message to be recognized by the receiver (e.g., base station of the RAN 108, or communication network 102) of the message, the CMC 110 can associate, add, or apply the tag to the data packets (e.g., repetitive data packets) of the message to indicate the downlink transmission (e.g., the data in the downlink message) to which the uplink message repetition (e.g., ACK or NACK message repetition) applies or relates.

In some embodiments, in accordance with certain communication management criteria, the applicable threshold value relating to a particular communication condition metric can be the second threshold value relating to that particular communication condition metric, which typically can be a lower value (e.g., a lower SINR, or a lower implicit NACK rate) than the first threshold value relating to that particular communication condition metric, but still can be a high enough value to ensure that the uplink transmission has a desirable (e.g., suitable or acceptable) communication condition metric value (e.g., SINR, or implicit NACK rate) and desirable robustness. In other embodiments, the communication management criteria can be structured to indicate that the applicable threshold value relating to a particular communication condition metric is to be the same as the first threshold value relating to that particular communication condition metric. By not modifying the parameters for the uplink transmission unless the particular communication condition metric has satisfied the applicable threshold value for at least the defined amount of time, the CMC 110 can keep from performing too many parameter adjustments due to the particular communication condition metric repeatedly swinging between being above a threshold value and below the threshold value relating to that communication condition metric in response to the parameter adjustments, and can thereby maintain stability of the uplink transmission.

With further regard to the defined minimum threshold number of resource blocks and the defined minimum threshold MCS value for uplink transmission, the CMC 110 (or another component of the system 100) can determine, set, and/or adjust (e.g., adaptively determine, set, and/or adjust) those respective threshold values based at least in part on one or more factors, in accordance with the defined communication management criteria. For instance, one communication management criterion can indicate that the defined minimum threshold number of resource blocks and the defined minimum threshold MCS value are to be determined, selected, or set to enable the uplink transmission to at least have a desirable (e.g., minimally acceptable) level of efficiency, data rate, and/or other characteristic(s) for the uplink transmission. In some embodiments, this communication management criterion can be the default communication management criterion for determining, selecting, or setting the defined minimum threshold number of resource blocks and the defined minimum threshold MCS value for uplink transmission.

In other embodiments, in accordance with another communication management criterion, the CMC 110 can modify the defined minimum threshold number of resource blocks and the defined minimum threshold MCS value for uplink transmission (e.g., to increase the respective minimum threshold values) based at least in part on one or more other factors, such as, for example, the status of uplink ACK/NACK transmissions (e.g., whether ACK/NACK transmissions are being segmented or buffered). For example, there can be instances where the CMC 110 (or another component of the system 100) can determine that a current minimum threshold number of resource blocks and/or a current minimum threshold MCS value (e.g., based at least in part on the default communication management criterion) can or may result in ACK transmission or NACK transmissions for uplink being segmented into multiple segments because there are not sufficient resources (e.g., resource blocks) to communication the ACK or NACK messages without segmenting the messages and/or buffered (e.g., buffered or backlogged in a buffer memory of the device 104) because there are not sufficient resources to communication the ACK or NACK messages at desired times. To mitigate (e.g., reduce, minimize, or eliminate) the segmenting or buffering of ACK and NACK messages for uplink transmission, the CMC 110 can determine (e.g., adaptively determine) a modification for the defined minimum threshold number of resource blocks to increase the threshold number of blocks for the minimum threshold number of resource blocks to a desired higher number for uplink transmission and/or determine (e.g., adaptively determine) a modification for the defined minimum threshold MCS value to increase the threshold MCS value to a for the defined minimum threshold MCS value to a higher MCS value based at least in part on a result of the status of uplink ACK/NACK transmissions (e.g., whether ACK/NACK transmissions are being segmented or buffered).

With further regard to the defined maximum threshold amount of repetition of data packets for the uplink transmission, the CMC 110 (or another component of the system 100) can determine, set, and/or adjust (e.g., adaptively determine, set, and/or adjust) the defined maximum threshold amount of repetition of data packets for uplink transmission for the device 104 based at least in part on one or more factors (e.g., number of UEs associated with the RAN 108 or communication network 102, respective quality of service (QoS) and/or quality of experience (QoE) specifications of the respective communication devices, and/or another factor), in accordance with the defined communication management criteria. For example, if the CMC 110 determines that there are relatively few communication devices associated with the RAN 108 or communication network 102 overall, and/or the overall QoS, QoE, and/or resource demands of such communication devices is relatively low, the CMC 110 can determine (e.g., adaptively determine) that the defined maximum threshold amount of repetition of data packets for uplink transmission for the device 104 can be a relatively higher amount of data packet repetition (e.g., such that a relatively higher number of copies of a particular data packet can be transmitted via the uplink transmission) without undesirably impacting the data communications, QoS, and/or QoE of the other communication devices associated with the RAN 108 or communication network 102. In such instances, the CMC 110 can accordingly set or adjust the defined maximum threshold amount of repetition of data packets for uplink transmission for the communication device 104 to a relatively higher amount (e.g., a relatively higher number of copies of a particular data packet).

However, if the CMC 110 determines that there is a relatively high number of communication devices associated with the RAN 108 or communication network 102, and/or the overall QoS, QoE, and/or resource demands of such communication devices is relatively high, the CMC 110 can determine (e.g., adaptively determine) that the defined maximum threshold amount of repetition of data packets for uplink transmission for the communication device 104 is to be relatively lower amount of data packet repetition (e.g., such that a relatively lower number of copies of a particular data packet can be transmitted via the uplink transmission) without undesirably impacting the data communications, QoS, and/or QoE of the other communication devices associated with the RAN 108 or communication network 102. In such instances, the CMC 110 can accordingly set or adjust the defined maximum threshold amount of repetition of data packets for uplink transmission for the communication device 104 to a relatively lower amount (e.g., a relatively lower number of copies of a particular data packet).

With further regard to step sizes, in some embodiments, the CMC 110 can determine, set, and/or adjust (e.g., adaptively determine, set, and/or adjust) a step size (e.g., an amount of change) of a modification of a parameter (e.g., resource block parameter, MCS parameter, and/or packet repetition parameter, . . . ) based at least in part on a communication condition metric (e.g., SINR or implicit NACK rate) associated with the uplink transmission in relation to the first threshold value relating to that communication condition metric or other applicable threshold value relating to that communication condition metric (whichever threshold value is applicable, in accordance with the defined communication management criteria). For example, the CMC 110 can analyze communication-related information relating to the communication condition metric for the uplink transmission of the device 104 to determine the communication condition metric and to evaluate the communication condition metric in relation to the first threshold value or other applicable threshold value relating to that communication condition metric. If, based at least in part on the results of the analysis and the evaluation, the CMC 110 determines that the communication condition metric is lower than the first threshold value, but is relatively close to the first threshold value, the CMC 110 can determine that a step size for a parameter(s) (e.g., resource block parameter, MCS parameter, and/or packet repetition parameter, . . . ) is to be set or adjusted to be relatively smaller. For instance, if the step size for the resource block parameter had been set or controlled to decrease the number of resource blocks by four blocks when the communication condition metric is determined to not be high enough to satisfy the first threshold value, in response to determining that the communication condition metric is (still) lower than the first threshold value, but is relatively close to the first threshold value, the CMC 110 can determine that the step size for the resource block parameter is to be reduced such that the modification of the resource block parameter will decrease the number of resource blocks by two resource blocks or by another number (e.g., three or one) that is lower than four resource blocks, in accordance with the defined communication management criteria.

If, however, based at least in part on the results of the analysis and the evaluation, the CMC 110 determines that the communication condition metric is lower than the first threshold value and is still relatively far away from the first threshold value, the CMC 110 can determine that a step size for a parameter(s) (e.g., resource block parameter, MCS parameter, and/or packet repetition parameter, . . . ) is to be maintained at its current step size, is to be set or adjusted to be relatively larger, or is to be set or adjusted to be relatively smaller (but not adjusted to reduce the step size as much as an instance where the communication condition metric is relatively close to the first threshold value). For instance, if the step size for the resource block parameter had been set or controlled to decrease the number of resource blocks by four blocks when the communication condition metric is determined to not be high enough to satisfy the first threshold value, in response to determining that the communication condition metric is still lower than the first threshold value and is relatively far away from the first threshold value, the CMC 110 can determine that the step size for the resource block parameter is to be maintained at its current step size of four resource blocks, is to be set or adjusted to be relatively larger (e.g., a step size of five resource blocks), or is to be set or adjusted to be relatively smaller (e.g., three resource blocks, but not adjusted to reduce the step size as much as a situation where the communication condition metric is relatively close to the first threshold value).

In a similar manner, the CMC 110 can determine whether the step size of the MCS value and/or the step size with regard to the amount of repetition of data packets are to adjusted (e.g., adaptively adjusted) based at least in part on the relative closeness of the communication condition metric of the uplink transmission for the device 104 to the first threshold value or other applicable threshold value, in accordance with the defined communication management criteria. For example, if, based at least in part on the results of the analysis and the evaluation, the CMC 110 determines that the communication condition metric is lower than the first threshold value, but is relatively close to the first threshold value, the CMC 110 can determine that a step size for the MCS parameter is to be set or adjusted to be relatively smaller, such that, if the step size for the resource block parameter had been set or controlled to decrease the MCS value by four when the communication condition metric is determined to not be high enough to satisfy the first threshold value, in response to determining that the communication condition metric is (still) lower than the first threshold value, but is relatively close to the first threshold value, the CMC 110 can determine that the step size for the MCS parameter is to be reduced such that the modification of the MCS parameter will decrease the MCS value by two or by another number (e.g., three or one) that is lower than four, in accordance with the defined communication management criteria.

In some embodiments, the communication device 104 can comprise a communication management agent component (CMAC) 118 that can determine and/or utilize resource blocks, an MCS value, and/or repetition of data packets based at least in part on parameter-related information (e.g., control, scheduling, and/or allocation information) received from the CMC 110. For example, the CMAC 118 can receive the parameter-related information from the CMC 110 via a downlink communication channel (e.g., downlink control channel). The CMAC 118 can analyze the parameter-related information, wherein the parameter-related information can indicate or specify the resource block parameter and/or the number of resource blocks allocated to the communication device 104 for the uplink transmission; the MCS parameter and/or the MCS value to be utilized for the uplink transmission, and/or the number of spatial streams, the modulation, and/or the coding rate to be utilized for the uplink transmission; and/or the packet repetition parameter and/or whether repetition of data packets is to be utilized for the uplink transmission, and, if so, the amount of repetition of data packets (e.g., two copies of a data packet, or three copies of the data packet, . . . ) to be utilized.

Based at least in part on the results of the analysis of the parameter-related information, the CMAC 118 can determine the resource block parameter and/or the number of resource blocks allocated to the communication device 104 for the uplink transmission; the MCS parameter and/or the MCS value to be utilized for the uplink transmission, and/or the number of spatial streams, the modulation, and/or the coding rate to be utilized for the uplink transmission; and/or the packet repetition parameter and/or whether repetition of data packets is to be utilized for the uplink transmission, and, if so, the amount of repetition of data packets (e.g., two copies of a data packet, or three copies of the data packet, . . . ) to be utilized. The CMAC 118 can control operation of the communication device 104 during the uplink transmission to utilize the allocated number of resource blocks, in accordance with the resource block parameter; to utilize the desired MCS value and accordingly the desired number of spatial streams, the desired modulation, and/or the desired coding rate, in accordance with the MCS parameter; and/or to utilize a desired amount of repetition of data packets or no repetition of data packets (as appropriate), in accordance with the packet repetition parameter.

The disclosed subject matter, by employing the CMC 110, can improve (e.g., increase) SINR, implicit NACK rate, and/or other uplink transmission-related metrics (e.g., RSRP, RSRQ, and/or CQI) and robustness of the uplink transmission associated with the communication device 104, and can reduce radio link failure of the uplink transmission, while also maintaining a desirable level of efficiency, data rate, and/or other characteristic(s) for the uplink transmission. Accordingly, the disclosed subject matter, by employing the CMC 110, also can improve connectivity stability (e.g., 5G NR connectivity stability), reduce the amount of signaling utilized with regard to the uplink transmission (e.g., reduce or minimize additional signaling due to the communication device having to set up a 5G NR leg (e.g., secondary leg) for the data plane again after radio link failure, since radio link failure can be reduced by the disclosed subject matter), improve (e.g., increase) data throughput (e.g., data throughput of the uplink transmission and downlink transmission), and improve (e.g., increase or enhance) other key performance indicators (KPIs).

These and other aspects and embodiments of the disclosed subject matter will now be described with regard to the other drawings.

Figure 2:
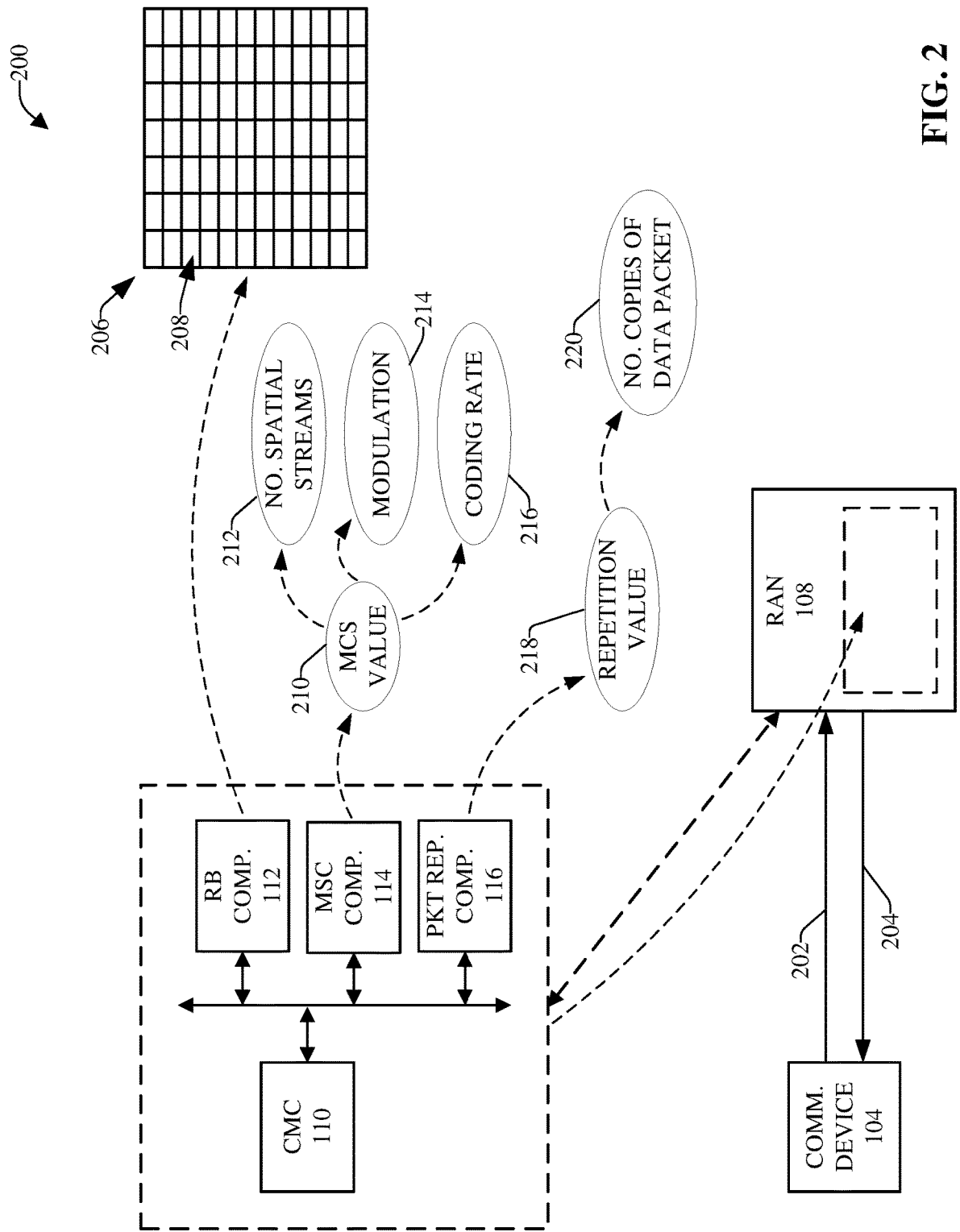
FIG. 2 illustrates a block diagram of another example, non-limiting system that can control a group of parameters associated with an uplink transmission of a communication device associated with a communication network to facilitate improving communication condition metric and robustness of the uplink transmission, in accordance with various aspects and embodiments of the disclosed subject matter.

Referring to FIG. 2, FIG. 2 illustrates a block diagram of another example, non-limiting system 200 that can control a group of parameters associated with an uplink transmission of a communication device associated with a communication network to facilitate improving communication condition metrics (e.g., the SINR and/or implicit NACK rate) and robustness of the uplink transmission, in accordance with various aspects and embodiments of the disclosed subject matter. The system 200 can comprise the communication device 104, the RAN 108, the CMC 110, the resource block component 112, the MCS component 114, and the packet repetition component 116. The communication device 104, the RAN 108, the CMC 110, the resource block component 112, the MCS component 114, and the packet repetition component 116 each can be the same as or similar to, and/or can comprise the same or similar functionality as, respective components (e.g., respectively named components), such as more fully described herein.

The communication device 104 can be communicatively connected to the RAN 108 via radio links (e.g., wireless communication links), wherein there can be an uplink transmission 202 to communicate information (e.g., ACK/NACK messages, user data, . . . ) from the communication device 104 to the RAN 108 and downlink transmission 204 to communicate information (e.g., control, allocation, and/or scheduling information, data, . . . ) from the RAN 108 to the communication device 104.

The CMC 110 can control the group of parameters (e.g., resource block parameter, MCS parameter, packet repetition parameter, and/or another desired parameter) relating to the uplink transmission 202 to facilitate improving the communication condition metrics and robustness associated with the uplink transmission 202, while also achieving a desired level of efficiency of the uplink transmission 202, in accordance with the defined communication management criteria, as more fully described herein. In connection with controlling the group of parameters, the CMC 110 can control operation of the resource block component 112. Resource blocks (e.g., PRBs), such as resource block 206, can be utilized to communicate user data, ACK/NACK messages, reference signals, control information, and/or other information from the communication device 104 to the RAN 108. Each resource block (e.g., resource block 206) can comprise a desired number of symbols (e.g., six symbols, seven symbols) in time domain form and a desired number of subcarriers (e.g., twelve consecutive subcarriers) in a frequency domain. Each resource block (e.g., resource block 206) can comprise a set (e.g., plurality or grid) of resource elements, such as resource element 208, wherein each resource element can comprise a dimension of one particular symbol and one particular subcarrier of the resource block (e.g., resource block 206). The CMC 110 can control the number of resource blocks allocated to the communication device 104 to facilitate improving a communication condition metric (e.g., the SINR or implicit NACK rate) and robustness associated with the uplink transmission 202 (e.g., by reducing the number of resource blocks allocated to the communication device 104 when the communication condition metric is below the first threshold value relating to the communication condition metric or other applicable threshold value relating to the communication condition metric), while also achieving a desired level of efficiency of the uplink transmission 202 (e.g., by maintaining at least a desired minimum number of resource blocks for the uplink transmission 202), in accordance with the defined communication management criteria, as more fully described herein.

Also, in connection with controlling the group of parameters, the CMC 110 can control operation of the MCS component 114 to determine, select, or modify an MCS value 210 (e.g., MCS index value) to control or modify a number (no.) of spatial streams 212 (e.g., one spatial stream, two spatial streams, . . . ) for the uplink transmission 202, the modulation 214 (e.g., BPSK, QPSK, QAM, 64-QAM, . . . ) utilized for the uplink transmission 202, and/or the coding rate 216 (e.g., ½, ¾, ⅔, ⅚, . . . ) utilized for the uplink transmission 202, in accordance with the defined communication management criteria, including applicable threshold values (e.g., defined minimum threshold MCS value), to facilitate improving the communication condition metric and robustness associated with the uplink transmission 202 (e.g., by reducing the MCS value associated with the uplink transmission 202 for the communication device 104 when a communication condition metric is below a first threshold value or other applicable threshold value relating to that communication condition metric).

Further, in connection with controlling the group of parameters, the CMC 110 can control operation of the packet repetition component 116 to determine, select, or modify a repetition value 218 (e.g., repetition parameter value) and, correspondingly, an amount of repetition of respective data packets, such as a number of copies of a data packet 220 (e.g., one data packet (e.g., no repetition of the data packet), two copies of the data packet, or three copies of the data packet, . . . ), in accordance with the defined communication management criteria, including applicable threshold values (e.g., defined maximum threshold amount of repetition of data packets), to facilitate improving the communication condition metrics and robustness associated with the uplink transmission 202 (e.g., by increasing the amount of repetition of respective data packets associated with the uplink transmission 202 when a communication condition metric is below a first threshold value or other applicable threshold value relating to the communication condition metric (and the number of resource blocks and MCS value are not able to be reduced any further)).

Figure 3:
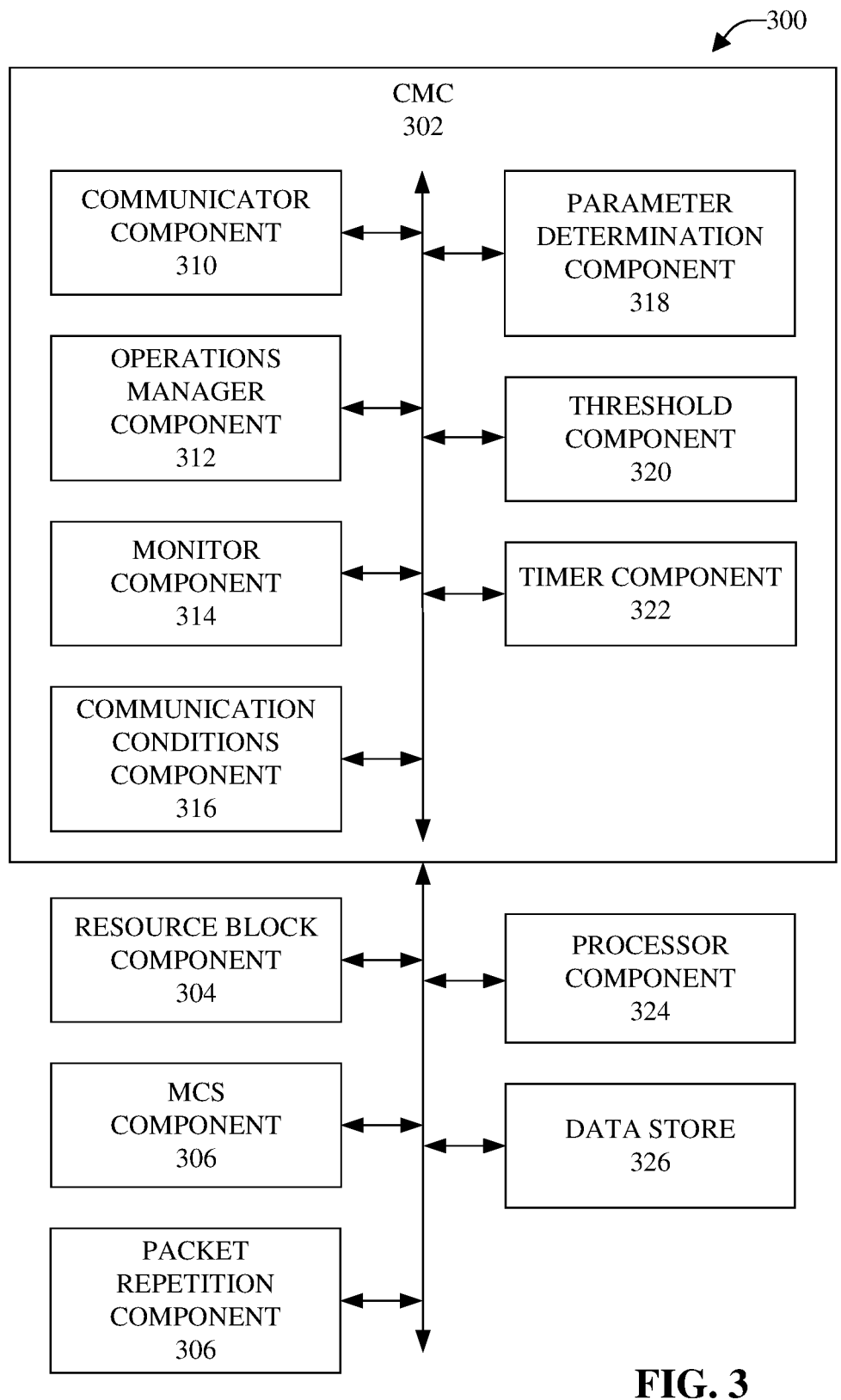
FIG. 3 depicts a block diagram of an example, non-limiting system that can comprise a communication management component to facilitate controlling a group of parameters associated with an uplink transmission of communication devices associated with a communication network to facilitate improving communication condition metrics and robustness of the uplink transmission, in accordance with various aspects and embodiments of the disclosed subject matter.

FIG. 3 depicts a block diagram of an example, non-limiting system 300 that can comprise a CMC to facilitate controlling a group of parameters associated with an uplink transmission of communication devices associated with a communication network to facilitate improving communication condition metrics and robustness of the uplink transmission, in accordance with various aspects and embodiments of the disclosed subject matter. The system 300 can comprise a CMC 302 that can control a group of parameters associated with respective uplink transmissions of respective communication devices associated with the communication network to facilitate improving the respective communication condition metrics (e.g., respective SINRs and/or respective implicit NACK rates) of the respective uplink transmissions of the respective communication devices. The system 300 also can comprise a resource block component 304, an MCS component 306, and a packet repetition component 308 that can be associated with (e.g., communicatively connected to) the CMC 302. The CMC 302, resource block component 304, MCS component 306, and packet repetition component 308 each can be the same as or similar to, and/or can comprise the same or similar functionality as, respective components (e.g., respectively named components), such as more fully described herein.

The CMC 302 can comprise a communicator component 310, an operations manager component 312, a monitor component 314, a communication conditions component 316, a parameter determination component 318, a threshold component 320, and a timer component 322. The communicator component 310 can communicate or facilitate communication of information to devices or components (e.g., communicating data to communication devices associated with the communication network, or communicating data to a network component of the communication network, . . . ), and can receive information from the other devices or components (e.g., receiving data received from communication devices, or receiving data from network components of the communication network, . . . ).

The operations manager component 312 that can control (e.g., manage) operations associated with the CMC 302. For example, the operations manager component 312 can facilitate generating instructions to have components of or associated with the CMC 302 perform operations, and can communicate respective instructions to respective components (e.g., communicator component 310, monitor component 314, communication conditions component 316, parameter determination component 318, . . . ) of or associated with the CMC 302 to facilitate performance of operations by the respective components of or associated with the CMC 302 based at least in part on the instructions, in accordance with the defined communication management criteria and the defined communication management algorithm(s) (e.g., communication management algorithms as disclosed, defined, recited, or indicated herein by the methods, systems, and techniques described herein). The operations manager component 312 also can facilitate controlling data flow between the respective components of the CMC 302 and controlling data flow between the CMC 302 and another component(s) or device(s) (e.g., devices or components of the communication network) associated with (e.g., connected to) the CMC 302.

The monitor component 314 can monitor communication conditions (e.g., SINR, implicit NACK rate, and/or other communication conditions) associated with communication devices associated with the communication network, or at least a RAN of the communication network. The monitor component 314 can receive communication-related information from communication devices, RAN(s), sensors associated with the communication network or RAN(s). The communication-related information can comprise or be related to the SINR associated with a communication device, the implicit NACK rate associated with the communication device, the RSRP associated with the communication device, the RSRQ associated with the communication device, the CQI associated with the communication device, and/or another desired wireless communications metric or parameter.

The communication conditions component 316 can determine respective communication conditions associated with respective communication devices that are associated with the communication network, or at least the RAN, based at least in part on the results of analyzing respective communication-related information associated with the respective communication devices. For instance, with regard to a communication device, the communication conditions component 316 can analyze communication-related information associated with the communication device that can be received by the CMC 302, for example, via the monitor component 314. Based at least in part on the results of analyzing the communication-related information, the communication conditions component 316 can determine or calculate communication conditions associated with the communication device, wherein such communication conditions can comprise the SINR, implicit, NACK rate, RSRP, RSRQ, CQI, and/or other wireless communications metrics or parameters associated with the communication device.

The parameter determination component 318 can determine parameters, including determining whether to modify parameters, of the group of parameters with regard to uplink transmission associated with a communication device, based at least in part on the communication conditions, including SINR and/or implicit NACK rate, associated with the communication device, in accordance with the defined communication management criteria, as more fully described herein with regard to the CMC. For instance, the parameter determination component 318 can determine whether to modify one or more parameters (e.g., resource block parameter, MCS parameter, packet repetition parameter, and/or another desired parameter) with regard to the uplink transmission associated with a communication device based at least in part on a communication condition metric (e.g., the SINR or implicit NACK rate) associated with the communication device, the first threshold value or other applicable threshold value relating to the communication condition metric, the defined minimum threshold number of resource blocks, the defined minimum threshold MCS value, the defined maximum threshold amount of repetition of data packets, and/or another desired factor(s) (e.g., an amount of time that the communication condition metric has satisfied an applicable threshold value relating to the communication condition metric).

The threshold component 320 can indicate, specify, determine, set, and/or modify respective threshold values (e.g., threshold levels) for respective communication condition metrics (e.g., respective communication quality metrics) and respective parameters of the group of parameters, in accordance with the defined communication management criteria. The respective threshold values for the respective parameters can comprise, for example, a first threshold value relating to a communication condition metric, a second threshold value or other applicable threshold value relating to relating to the communication condition metric, the defined minimum threshold number of resource blocks associated with the resource block parameter, the defined minimum threshold MCS value associated with the MCS parameter, and/or the defined maximum threshold amount of repetition of data packets associated with the packet repetition parameter.

The timer component 322 can track time, for example, in connection with the tracking of a communication condition metric associated with communication devices and making decisions regarding the modification or setting of parameters of the group of parameters (e.g., resource block parameter, MCS parameter, packet repetition parameter, and/or other parameter) associated with uplink transmissions of communication devices. For example, the timer component can track an amount of time that has elapsed since a SINR associated with a communication device has satisfied a first threshold value (e.g., a first threshold SINR) to facilitate the CMC 302 determining whether one or more parameters (e.g., resource block parameter, MCS value, and/or packet repetition parameter) of the group of parameters is to be modified to increase the number of resource blocks, increase the MCS value, and/or decrease the amount of repetition of data packets with regard to uplink transmission of the communication device in order to improve efficiency of the uplink transmission while still maintaining a desirable SINR, as more fully described herein. The timer component 322 can maintain respective timers, and can track respective amounts of time via the respective timers, for respective communication devices associated with the communication device, or at least the RAN.

The system 300 also can comprise a processor component 324 that can work in conjunction with the other components (e.g., CMC 302 and its components, resource block component 304, MCS component 306, packet repetition component 308, and data store 326) to facilitate performing the various functions of the system 300. The processor component 324 can employ one or more processors, microprocessors, or controllers that can process data, such as information relating to communication conditions (e.g., SINR, implicit NACK rate, RSRP, RSRQ, CQI, and/or other wireless communication condition metrics or parameters) associated with communication devices, the group of parameters (e.g., resource block parameter, MCS parameter, packet repetition parameter, and/or other desired parameter), the respective threshold values associated with the respective parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), . . . ), protocols, interfaces, tools, and/or other information, to facilitate operation of the system 300 and CMC 302, as more fully disclosed herein, and control data flow between the system 300, including the CMC 302, and other components (e.g., network components of or associated with the communication network, communication devices, applications, . . . ) associated with the system 300.

The system 300 further can include a data store 326 that can store data structures (e.g., user data, metadata), code structure(s) (e.g., modules, objects, hashes, classes, procedures) or instructions, information relating to communication conditions (e.g., SINR, implicit NACK rate, RSRP, RSRQ, CQI, and/or other wireless communication condition metrics or parameters) associated with communication devices, the group of parameters (e.g., resource block parameter, MCS parameter, packet repetition parameter, and/or other desired parameter), the respective threshold values associated with the respective parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), . . . ), protocols, interfaces, tools, and/or other information, to facilitate controlling operations associated with the system 300. In an aspect, the processor component 324 can be functionally coupled (e.g., through a memory bus) to the data store 326 in order to store and retrieve information desired to operate and/or confer functionality, at least in part, to the CMC 302 and its components, resource block component 304, MCS component 306, packet repetition component 308, and data store 326, etc., and/or substantially any other operational aspects of the system 300.

It should be appreciated that the data store 326 can comprise volatile memory and/or nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which can act as external cache memory. By way of example and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The systems and/or devices have been (or will be) described herein with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowchart in FIGS. 4-7. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 4:
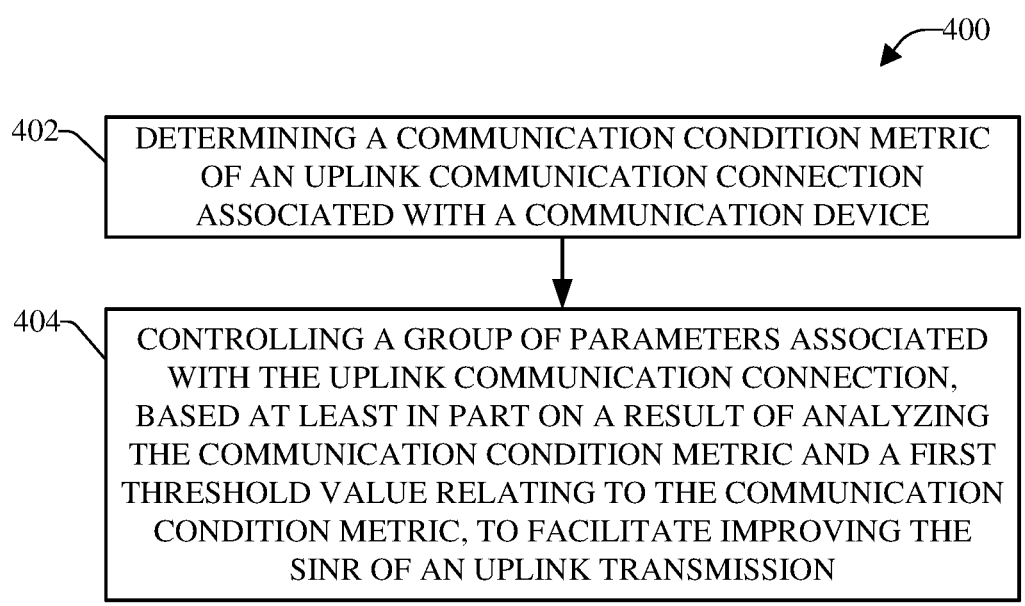
FIG. 4 illustrates a flow diagram of an example, non-limiting method that can control a group of parameters associated with an uplink transmission of a communication device associated with a communication network to facilitate improving communication condition metrics and robustness of the uplink transmission, in accordance with various aspects and embodiments of the disclosed subject matter.

FIG. 4 illustrates a flow diagram of an example, non-limiting method 400 that can control a group of parameters associated with an uplink transmission of a communication device associated with a communication network to facilitate improving the communication condition metrics and robustness of the uplink transmission, in accordance with various aspects and embodiments of the disclosed subject matter. The method 400 can be implemented by a system that can comprise a CMC of or associated with the communication network, a processor component, a data store, and/or another component(s). Alternatively, or additionally, a machine-readable storage medium can comprise executable instructions that, when executed by a processor, facilitate performance of the operations of the method 400.

At 402, a communication condition metric of an uplink communication connection associated with a communication device can be determined. The CMC can receive and analyze communication-related data regarding an uplink communication connection (e.g., a wireless uplink communication connection) associated with the communication device. Based at least in part on the results of the analysis, the CMC can determine the communication condition metric (e.g., the SINR, the implicit NACK rate, or other desired communication condition metric) of the uplink communication connection.

At 404, a group of parameters associated with the uplink communication connection can be controlled, based at least in part on a result of analyzing the communication condition metric and a first threshold value relating to the communication condition metric, to facilitate improving the communication condition metric of an uplink transmission. The CMC can analyze the communication condition metric and the first threshold value relating to the communication condition metric. The first threshold value relating to the communication condition metric can be determined and set (e.g., by the CMC), based at least in part on the defined communication management criteria, to facilitate enhancing (e.g., improving) the robustness of the uplink transmission, providing a desirable communication condition metric (e.g., SINR or implicit NACK rate) for the uplink transmission, and reducing radio link failure of the uplink transmission. Based at least in part on the results of analyzing the communication condition metric and the first threshold value, the CMC can control the group of parameters (e.g., communication parameters, such as uplink and/or resource parameters) associated with the uplink communication connection. The group of parameters can comprise, for example, the resource block parameter relating to the number of resource blocks (e.g., PRBs) utilized during the uplink transmission, the MCS parameter relating to an MCS value utilized during the uplink transmission, the packet repetition parameter relating to the amount of repetition of transmission of a particular data packet (e.g., the number of copies of such data packet) that is to be communicated during the uplink transmission, and/or another desired parameter relating to the uplink transmission.

For instance, as more fully described herein, in response to determining that the communication condition metric does not satisfy the first threshold value (e.g., the communication condition metric does not meet or exceed the first threshold communication condition metric value), the CMC can modify (e.g., adjust or reduce) the resource block parameter to reduce the number of resource blocks and/or modify the MCS parameter to reduce the MCS value to facilitate improving (e.g., increasing or enhancing) the communication condition metric of the uplink transmission and achieving a communication condition metric that satisfies the first threshold value, in accordance with the defined communication management criteria. If the number of resource blocks and the MCS value are not able to be reduced any further (e.g., due to respective threshold minimum levels for the resource blocks and the MCS value being reached (e.g., being satisfied)) to achieve a communication condition metric that satisfies the first threshold value, the CMC can modify (e.g., adjust or increase) the packet repetition parameter to increase the amount of repetition of transmission of a particular data packet (e.g., up to a maximum repetition number for repetition of the transmission of such data packet) to facilitate improving the communication condition metric of the uplink transmission and achieving a communication condition metric that satisfies the first threshold value, in accordance with the defined communication management criteria.

Also, as more fully described herein, the CMC can control the group of parameters to increase the number of resource blocks and/or the MCS value, and/or reduce the amount of repetition of transmission of a particular data packet, for the uplink transmission, in response to determining that the communication condition metric has satisfied an applicable threshold value relating to the communication condition metric (e.g., the first threshold value or a second threshold value relating to the communication condition metric) for at least a defined period of time (e.g., a defined amount of time), wherein the CMC can determine the applicable threshold value to use based at least in part on the defined communication management criteria.

Figure 5:
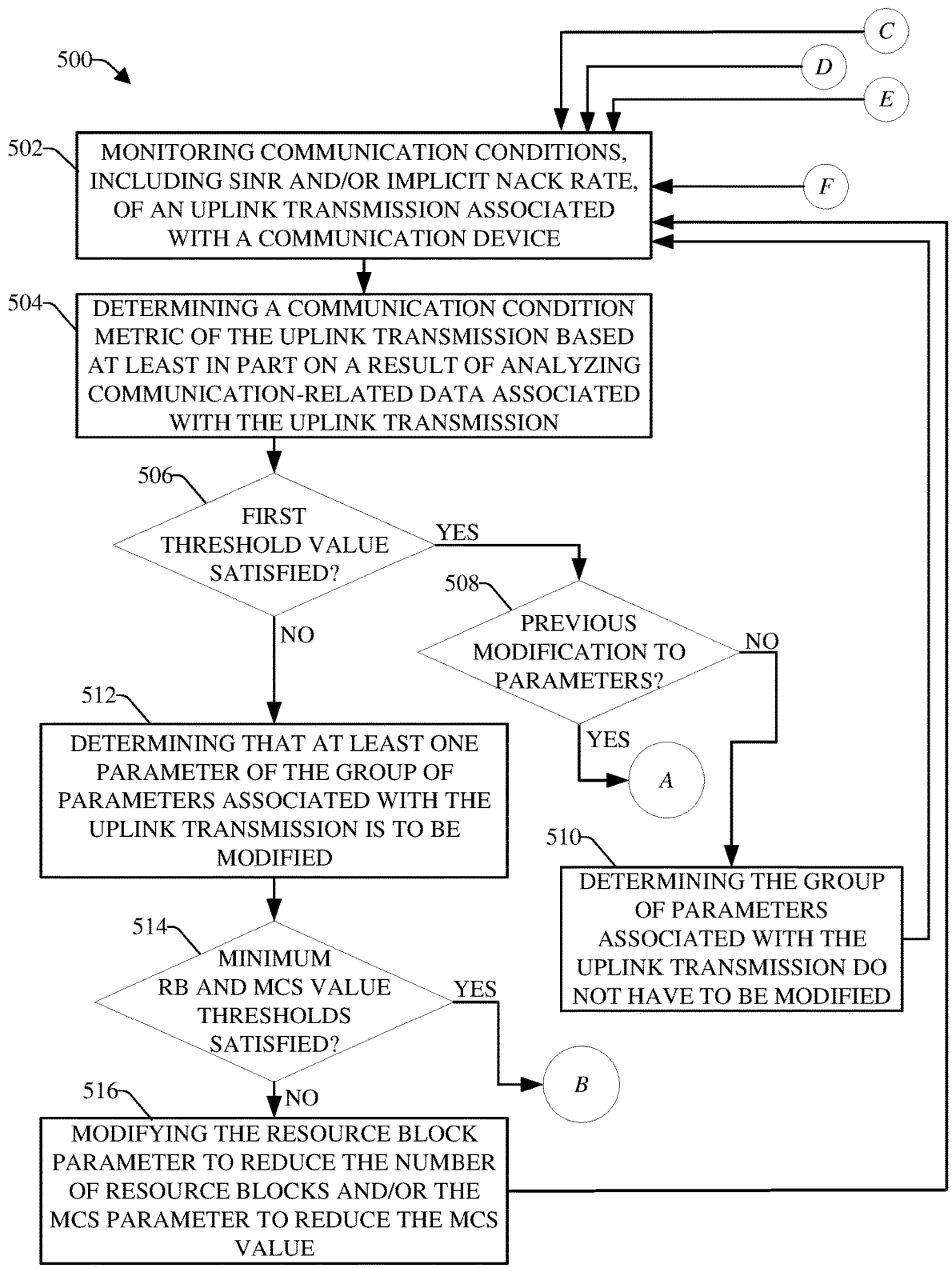
FIG. 5 depicts a flow diagram of an example, non-limiting method depicts a flow diagram of another example, non-limiting method that can control a group of parameters associated with an uplink transmission of a communication device associated with a communication network to facilitate improving communication condition metrics and robustness of the uplink transmission, in accordance with various aspects and embodiments of the disclosed subject matter.

FIG. 5 depicts a flow diagram of another example, non-limiting method 500 that can control a group of parameters associated with an uplink transmission of a communication device associated with a communication network to facilitate improving communication condition metrics and robustness of the uplink transmission, in accordance with various aspects and embodiments of the disclosed subject matter. The method 500 can be implemented by a system that can comprise a CMC of or associated with the communication network, a processor component, a data store, and/or another component(s). Alternatively, or additionally, a machine-readable storage medium can comprise executable instructions that, when executed by a processor, facilitate performance of the operations of the method 500.

At 502, communication conditions, including a SINR and/or implicit NACK rate, of an uplink transmission associated with a communication device can be monitored. The CMC and/or other components of the system (e.g., monitor component and/or sensors of the system) can monitor an uplink communication connection associated with the communication device. During the monitoring, the CMC can receive and analyze the communication-related data associated with (e.g., relating to) the uplink transmission.

At 504, a communication condition metric of the uplink transmission can be determined based at least in part on a result of analyzing the communication-related data associated with the uplink transmission. The CMC can analyze the communication-related data, and based at least in part on the result of the analysis, can determine the communication condition metric (e.g., SINR, implicit NACK rate, or other desired communication condition metric) associated with the uplink transmission.

At 506, a determination can be made regarding whether the communication condition metric satisfies a first threshold value relating to the communication condition metric. The CMC can analyze the communication condition metric and the first threshold value. The first threshold value (e.g., first threshold SINR, or first threshold implicit NACK rate) can be determined and set (e.g., by the CMC), based at least in part on the defined communication management criteria, to facilitate enhancing (e.g., improving) the robustness of the uplink transmission, providing a desirable communication condition metric for the uplink transmission, and/or reducing radio link failure of the uplink transmission. Based at least in part on the results of analyzing the communication condition metric and the first threshold value, the CMC can determine whether the communication condition metric satisfies the first threshold value.

In response to determining that the communication condition metric satisfies the first threshold value, at 508, a determination can be made regarding whether a group of parameters associated with the uplink transmission had previously been modified to improve (e.g., increase) the communication condition metric (or other communication condition metric) of the uplink transmission. The group of parameters can comprise, for example, the resource block parameter relating to the number of resource blocks (e.g., PRBs) utilized during the uplink transmission, the MCS parameter relating to an MCS value utilized during the uplink transmission, the packet repetition parameter relating to the amount of repetition of transmission of a particular data packet that is to be communicated during the uplink transmission, and/or another desired parameter. In response to determining that the communication condition metric satisfies the first threshold value, the CMC can determine whether the group of parameters (e.g., resource block parameter, MCS parameter, packet repetition parameter, and/or other desired parameter) associated with the uplink transmission had previously been modified to improve (e.g., increase) the communication condition metric (or other communication condition metric) of the uplink communication connection. For instance, the CMC can determine whether the resource block parameter had been modified to reduce the number of resource blocks utilized for the uplink communication connection and/or the MCS parameter had been modified to reduce the MCS value utilized for the uplink communication connection, and/or whether the packet repetition parameter had been modified to increase the number of copies of a data packet that are transmitted via the uplink communication connection, to improve the communication condition metric (or other communication condition metric) of the uplink transmission.

In response to determining that the group of parameters associated with the uplink transmission had not previously been modified to improve the communication condition metric (or other communication condition metric) of the uplink transmission, at 510, it can be determined that the group of parameters associated with the uplink transmission do not have to be modified. In response to determining that the communication condition metric satisfies the first threshold value, and in response to determining that the group of parameters associated with the uplink transmission had not previously been modified to improve the communication condition metric (or other communication condition metric) of the uplink transmission, the CMC can determine that the group of parameters do not have to be modified. At this point, the method 500 can proceed from reference numeral 510 to reference numeral 502, wherein the method 500 can proceed from that point to monitor the communication conditions, including the SINR and/or implicit NACK rate, of the uplink transmission and continue from that point to perform other operations of the method 500.

Figure 6:
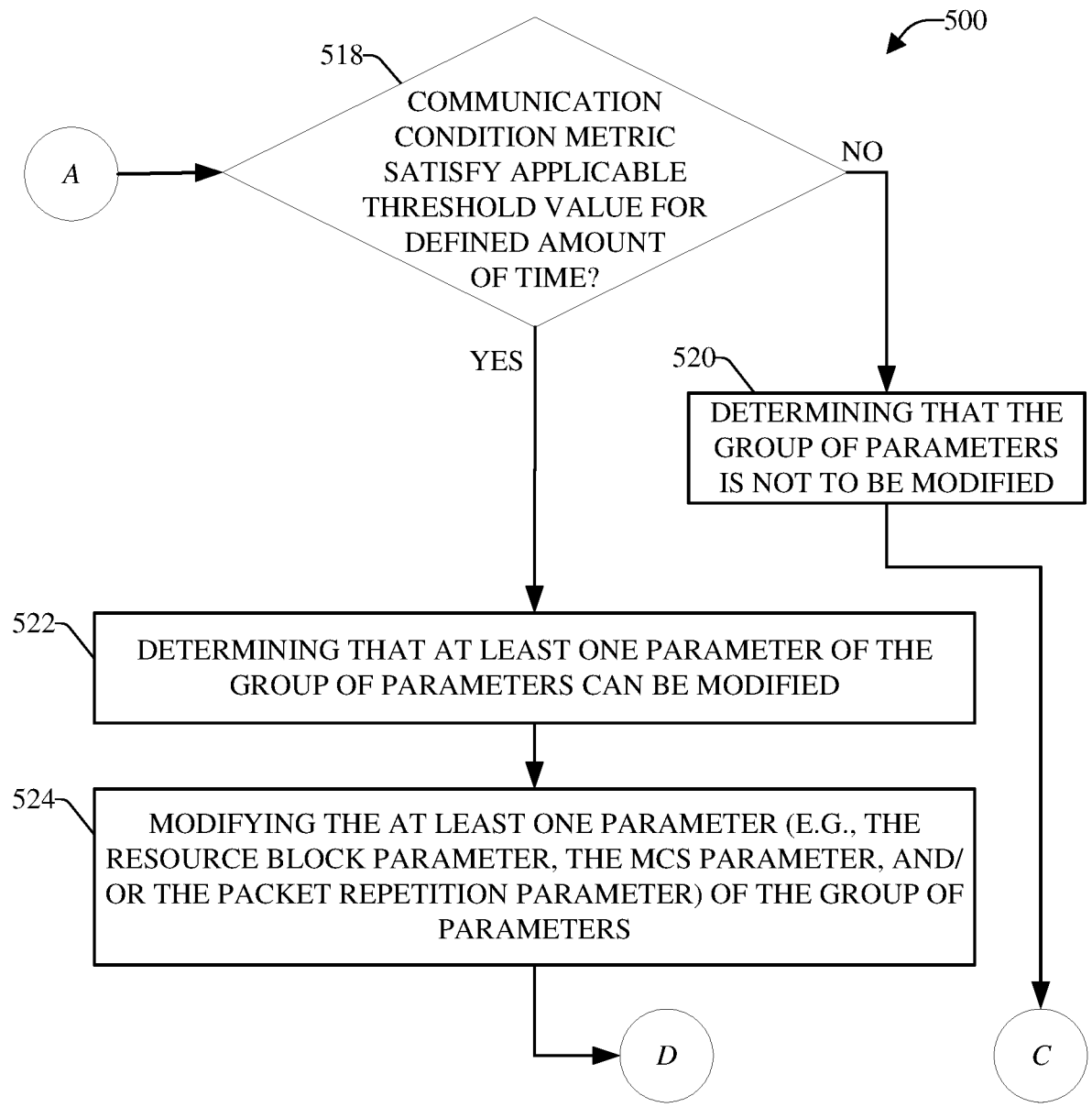
FIG. 6 illustrates a flow diagram of a portion of the example, non-limiting method that can control the group of parameters associated with the uplink transmission of the communication device, wherein a communication condition metric has satisfied at least the first threshold value relating to the communication condition metric, in accordance with various aspects and embodiments of the disclosed subject matter.

If, at reference numeral 508, it is determined that the group of parameters associated with the uplink transmission had previously been modified to improve (e.g., increase) the communication condition metric (or other communication condition metric) of the uplink transmission, the method 500 can proceed to reference point A, wherein, as depicted in FIG. 6, the method 500 can proceed from reference point A to reference numeral 518 to facilitate determining whether one or more parameters of the group of parameters are to be modified to increase the number of resource blocks, increase the MCS value, or reduce the amount of repetition of data packets for the uplink transmission, as more fully described below with regard to FIG. 6.

Referring again to reference numeral 506, if, at 506, it is determined that the communication condition metric for the uplink transmission does not satisfy the first threshold value, at 512, it can be determined that at least one parameter of the group of parameters associated with the uplink transmission is to be modified. In response to determining that the communication condition metric does not satisfy the first threshold value, the CMC can determine that at least one parameter (e.g., the resource block parameter, the MCS parameter, the packet repetition parameter, and/or another parameter) of the group of parameters is to be modified to facilitate improving the communication condition metric of the uplink transmission.

At 514, a determination can be made regarding whether the number of resource blocks (RBs) satisfies a defined minimum threshold number of resource blocks and whether the MCS value satisfies a defined minimum threshold MCS value. In response to determining that at least one parameter of the group of parameters is to be modified, the CMC can determine whether the number of resource blocks satisfies the defined minimum threshold number of resource blocks and whether the MCS value satisfies the defined minimum threshold MCS value. If the number of resource blocks is at the defined minimum threshold number of resource blocks, the CMC can determine that the number of resource blocks cannot be reduced any further, and thus, the resource block parameter cannot be modified (e.g., reduced) any further to reduce the number of resource blocks. If the MCS value is at the defined minimum threshold MCS value, the CMC can determine that the MCS value cannot be reduced any further, and thus, the MCS parameter cannot be modified (e.g., reduced) any further to reduce the MCS value.

Figure 7:
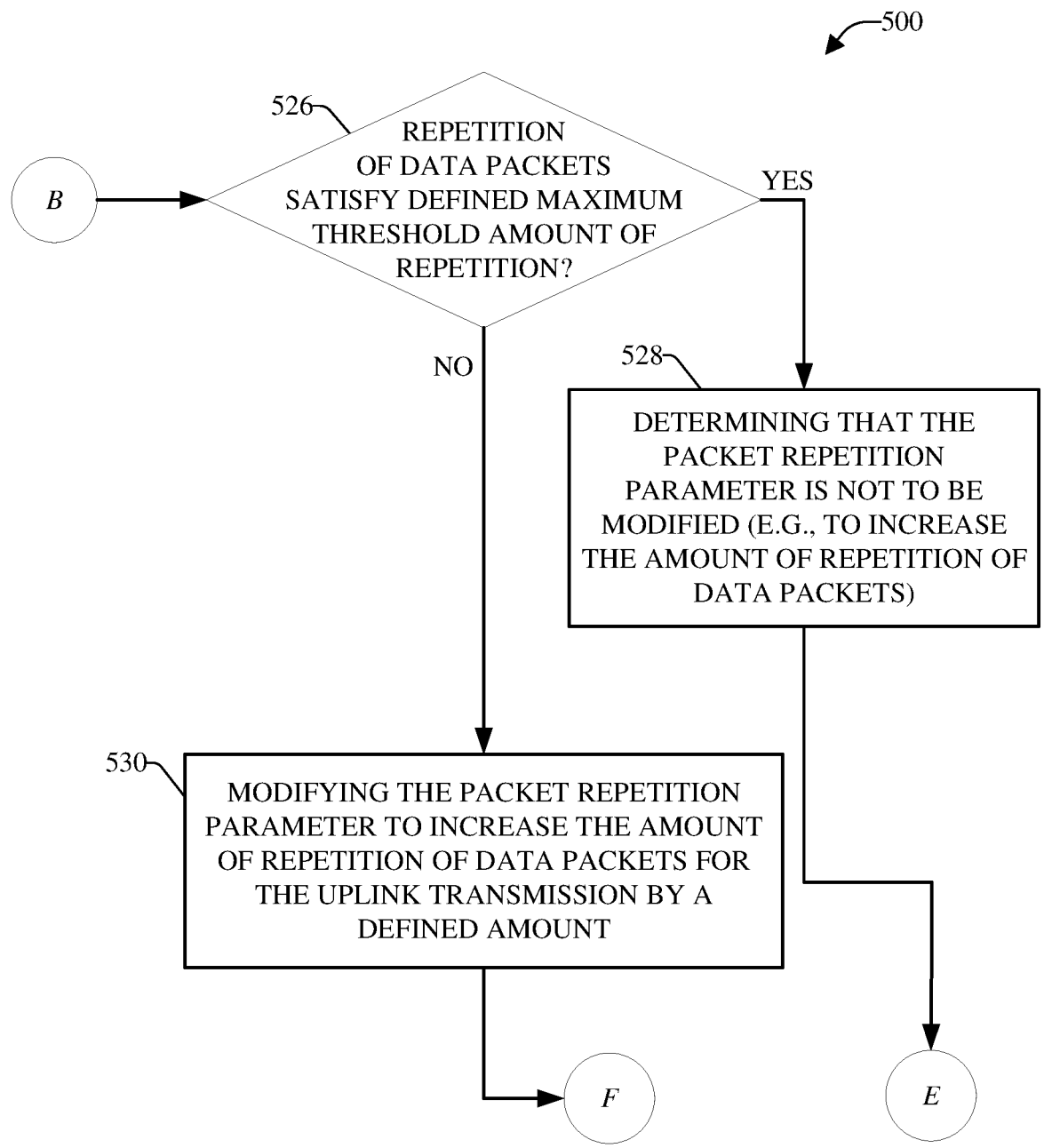
FIG. 7 presents a flow diagram of another portion of the example, non-limiting method that can control the group of parameters associated with the uplink transmission associated with the communication device, wherein it has been determined that that the number of resource blocks for the uplink transmission satisfies the defined minimum threshold number of resource blocks and a modulation and coding scheme (MCS) value for the uplink transmission satisfies the defined minimum threshold MCS value, in accordance with various aspects and embodiments of the disclosed subject matter.

In response to determining that the number of resource blocks satisfies the defined minimum threshold number of resource blocks and determining that the MCS value satisfies the defined minimum threshold MCS value, the method 500 can proceed to reference point B, wherein, as illustrated in FIG. 7, the method 500 can proceed from reference point B to reference numeral 526 to facilitate evaluating another parameter(s) (e.g., packet repetition parameter) and determining whether such other parameter(s) can be modified, since the resource block parameter and the MCS parameter are not able to be modified (e.g., reduced) at this point. In some embodiments, the method 500 of FIG. 7 can proceed from reference point B, as more fully described herein with respect to FIG. 7.

If, at reference numeral 514, it is determined that the number of resource blocks does not satisfy the defined minimum threshold number of resource blocks and/or the MCS value does not satisfy the defined minimum threshold MCS value, at 516, the resource block parameter can be modified to reduce the number of resource blocks and/or the MCS parameter can be modified to reduce the MCS value. If the CMC determines that the number of resource blocks does not satisfy the defined minimum threshold number of resource blocks and/or the MCS value does not satisfy the defined minimum threshold MCS value, the CMC can modify (e.g., reduce) the resource block parameter to reduce the number of resource blocks by a desired number of resource blocks (e.g., two resource blocks, four resource blocks, or another desired number) (that will not reduce the number of resource blocks below the defined minimum threshold number of resource blocks) and/or can modify (e.g., reduce) the MCS parameter to reduce the MCS value by a defined number (e.g., reduce the MCS value by two, four, or another desired number) (that will not reduce the MCS value below the defined minimum threshold MCS value). At this point, the method 500 can proceed from reference numeral 516 to reference numeral 502, wherein the method 500 can proceed from that point to monitor the communication conditions, including the SINR and/or implicit NACK rate, of the uplink transmission associated with the communication device and continue from that point to perform other operations of the method 500.

FIG. 6 illustrates a flow diagram of a portion of the example, non-limiting method 500 that can control the group of parameters associated with the uplink transmission of the communication device, wherein the communication condition metric has satisfied at least the first threshold value relating to the communication condition metric, in accordance with various aspects and embodiments of the disclosed subject matter.

In some embodiments, the portion of the method 500 with respect to FIG. 6 can proceed from reference point A of the method 500 as described with regard to FIG. 5. At this point, it already can be determined that the communication condition metric of the uplink transmission satisfies the first threshold value and that one or more parameters of the group of parameters had previously been modified to, for example, reduce the number of resource blocks used, reduce the MCS value, and/or increase the amount of repetition of transmission of data packets for the uplink transmission. This portion of the method 500 can be employed to determine whether one or more parameters of the group of parameters are to be modified to, for example, increase the number of resource blocks used, increase the MCS value, and/or decrease the amount of repetition of transmission of data packets for the uplink transmission, since the communication condition metric of the uplink transmission at least satisfies the first threshold value.

At 518, a determination can be made regarding whether the communication condition metric has satisfied an applicable threshold value relating to the communication condition metric for at least a defined amount of time. The CMC can determine whether the communication condition metric has satisfied the applicable threshold value relating to the communication condition metric for at least the defined amount of time, in accordance with the defined communication management criteria. In some embodiments, the applicable threshold value can be the same as the first threshold value, and, in other embodiments, the applicable threshold value can be a second (e.g., different) threshold value relating to the communication condition metric. The CMC also can determine and set the defined amount of time in accordance with the defined communication management criteria.

In response to determining that the communication condition metric of the uplink transmission has not satisfied the applicable threshold value for at least the defined amount of time, at 520, it can be determined that the group of parameters is not to be modified. In response to determining that the communication condition metric has not satisfied the applicable threshold value for at least the defined amount of time, the CMC can determine that the group of parameters is not to be modified at this time. At this point, the method 500 can proceed from reference numeral 520 to reference point C, wherein the method 500 can proceed from reference point C to reference numeral 502 with respect to FIG. 5, wherein the method 500 can proceed from that point to monitor the communication conditions, including the SINR and/or the implicit NACK rate, of the uplink transmission of the communication device and can continue from that point to perform other operations of the method 500, as appropriate.

If, at reference numeral 518, it is determined that the communication condition metric of the uplink transmission has satisfied the applicable threshold value for at least the defined amount of time, at 522, it can be determined that at least one parameter of the group of parameters can be modified. At 524, the at least one parameter (e.g., the resource block parameter, the MCS parameter, and/or the packet repetition parameter) of the group of parameters can be modified.

In response to determining that the communication condition metric of the uplink transmission has satisfied the applicable threshold value for at least the defined amount of time, the CMC can determine that at least one parameter of the group of parameters can be modified, for example, to increase the number of resource blocks utilized for the uplink transmission, increase the MCS value for the uplink transmission, and/or reduce the amount of repetition of data packets for the uplink transmission. For instance, if repetition of data packets had previously been increased for the uplink transmission, the CMC can determine that the packet repetition parameter can be modified (e.g., reduced) to decrease the amount of repetition of data packets used for the uplink transmission by a desired amount (e.g., decrease the number of copies of a data packet by one, by two, or by another desired number). As another example, if the number of resource blocks had previously been decreased and/or the MCS value had previously been decreased (and if there is no repetition of data packets for the uplink transmission), the CMC can determine that the resource block parameter can be modified (e.g., increased) to increase the number of resource blocks used for the uplink transmission by a defined number of resource blocks (e.g., increase the number of resource blocks by two, four, or other desired number of resource blocks) and/or the MCS parameter can be modified (e.g., increased) to increase the MCS value used for the uplink transmission by a defined amount (e.g., increase the MCS value by two, four, or other desired number), in accordance with the defined communication management criteria. The CMC can modify the at least one parameter of the group of parameters.

At this point, the method 500 can proceed from reference numeral 524 to reference point D, wherein the method 500 can proceed from reference point D to reference numeral 502 with respect to FIG. 5, wherein the method 500 can proceed from that point to monitor the communication conditions, including the SINR and/or implicit NACK rate, of the uplink transmission of the communication device and can continue from that point to perform other operations of the method 500, as appropriate.

FIG. 7 presents a flow diagram of another portion of the example, non-limiting method 500 that can control the group of parameters associated with the uplink transmission associated with the communication device, wherein it has been determined that that the number of resource blocks for the uplink transmission satisfies the defined minimum threshold number of resource blocks and the MCS value for the uplink transmission satisfies the defined minimum threshold MCS value, in accordance with various aspects and embodiments of the disclosed subject matter. In some embodiments, the portion of the method 500 with respect to FIG. 7 can proceed from reference point B of the method 500 as described with regard to FIG. 5. At this point, it already can be determined that the number of resource blocks for the uplink transmission satisfies the defined minimum threshold number of resource blocks and the MCS value for the uplink transmission satisfies the defined minimum threshold MCS value. This portion of the method 500 can be employed to determine whether the packet repetition parameter is to be modified to increase the amount of repetition of data packets for the uplink transmission.

At 526, a determination can be made regarding whether the amount of repetition of data packets for the uplink transmission satisfies a defined maximum threshold amount of repetition of data packets for the uplink transmission. The CMC can evaluate the amount of repetition of data packets for the uplink transmission, and can compare that amount of repetition of data packets to the defined maximum threshold amount of repetition of data packets to determine whether the amount of repetition of data packets satisfies (e.g., meets or is the same as) the defined maximum threshold amount of repetition of data packets.

In response to determining that the amount of repetition of data packets for the uplink transmission satisfies the defined maximum threshold amount of repetition of data packets for the uplink transmission, at 528, it can be determined that the packet repetition parameter is not to be modified (e.g., to increase the amount of repetition of data packets). In response to the CMC determining that the amount of repetition of data packets satisfies the defined maximum threshold amount of repetition of data packets, the CMC can determine that the packet repetition parameter is not to be modified, since the amount of repetition of data packets for the uplink transmission is already at the maximum amount of repetition of data packets permitted, in accordance with the defined communication management criteria. At this point, the method 500 can proceed from reference numeral 528 to reference point E, wherein the method 500 can proceed from reference point E to reference numeral 502 with respect to FIG. 5, wherein the method 500 can proceed from that point to monitor the communication conditions, including the SINR and/or implicit NACK rate, of the uplink transmission of the communication device and can continue from that point to perform other operations of the method 500, as appropriate.

Referring again to reference numeral 526, if, at 526, it is determined that the amount of repetition of data packets for the uplink transmission does not satisfy the defined maximum threshold amount of repetition of data packets for the uplink transmission, at 530, the packet repetition parameter can be modified to increase the amount of repetition of data packets for the uplink transmission by a defined amount. For instance, if the CMC determines that the amount of repetition of data packets for the uplink transmission does not satisfy (e.g., is not at) the defined maximum threshold amount of repetition of data packets for the uplink transmission, the CMC can determine that the packet repetition parameter can be modified to increase the amount of repetition of data packets for the uplink transmission by the defined amount (e.g., increase repetition of a data packet by one, by two, or by another desired number), in accordance with the defined communication management criteria. Accordingly, the CMC can modify the packet repetition parameter to increase the amount of repetition of data packets for the uplink transmission by the defined amount.

At this point, the method 500 can proceed from reference numeral 530 to reference point F, wherein the method 500 can proceed from reference point F to reference numeral 502 with respect to FIG. 5, wherein the method 500 can proceed from that point to monitor the communication conditions, including the SINR and/or implicit NACK rate, of the uplink transmission of the communication device and can continue from that point to perform other operations of the method 500, as appropriate.

Described herein are systems, methods, articles of manufacture, and other embodiments or implementations that can facilitate controlling a group of parameters associated with respective uplink transmissions of respective communication devices (e.g., mobile or wireless communication devices, IoT devices, or other communication devices) associated with a communication network to facilitate improving the respective SINRs and robustness of the respective uplink transmissions, and/or performing other operations in connection with managing communication of data by communication devices associated with the communication network. The controlling of the group of parameters associated with the respective uplink transmissions of the respective communication devices associated with the communication network (e.g., core or wireless network of the communication network), managing communication of data by communication devices associated with the communication network, and/or other features of the disclosed subject matter, can be implemented in connection with any type of device with a connection to the communication network (e.g., a wireless or mobile device, a computer, a handheld device, etc.), any Internet of things (IoT) device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 8:
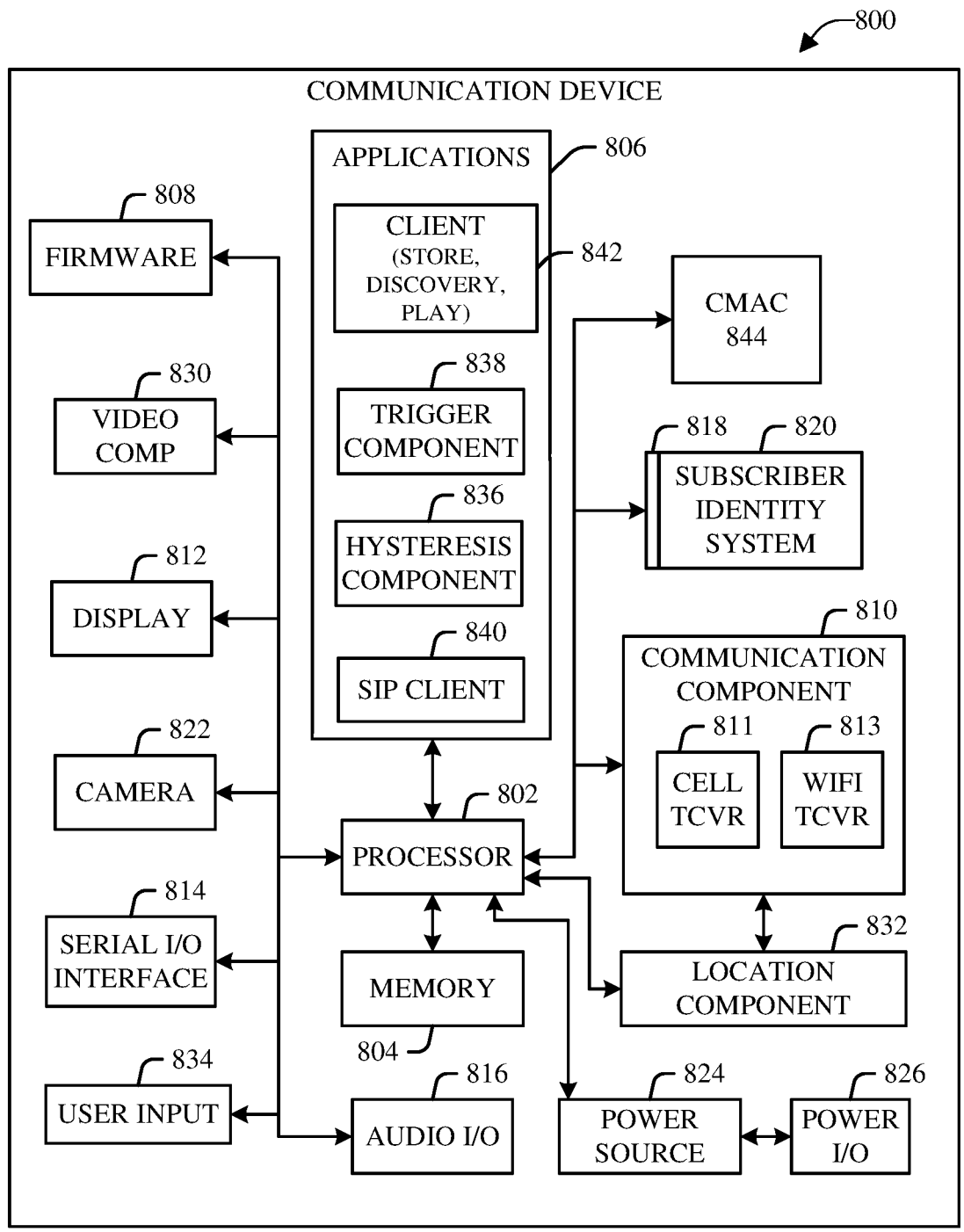
FIG. 8 depicts an example block diagram of an example communication device operable to engage in a system architecture that facilitates wireless communications according to one or more embodiments described herein.

Referring now to FIG. 8, depicted is an example block diagram of an example communication device 800 (e.g., wireless phone, electronic pad or tablet, or IoT device, . . . ) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 800 can include a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor 802 from either or both the memory 804 or/and the firmware 808. The firmware 808 can also store startup code for execution in initializing the communication device 800. A communication component 810 interfaces to the processor 802 to facilitate wired/wireless communication with external systems, e.g., cellular networks, VoIP networks, and so on. Here, the communication component 810 can also include a suitable cellular transceiver 811 (e.g., a GSM transceiver) and/or an unlicensed transceiver 813 (e.g., WI-FI, WIMAX) for corresponding signal communications. The communication device 800 can be a device such as a cellular telephone, a PDA with mobile communications capabilities, and messaging-centric devices. The communication component 810 also facilitates communications reception from terrestrial radio networks (e.g., broadcast), digital satellite radio networks, and Internet-based radio services networks.

The communication device 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The communication device 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the communication device 800, and updated by downloading data and software.

The communication device 800 can process IP data traffic through the communication component 810 to accommodate IP traffic from an IP network such as, for example, the Internet, a corporate intranet, a home network, a person area network, etc., through an ISP or broadband cable provider. Thus, VoIP traffic can be utilized by the communication device 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The communication device 800 also includes a power source 824 in the form of batteries and/or an AC power subsystem, which power source 824 can interface to an external power system or charging equipment (not shown) by a power I/O component 826.

The communication device 800 can also include a video component 830 for processing video content received and, for recording and transmitting video content. For example, the video component 830 can facilitate the generation, editing and sharing of video quotes. A location tracking component 832 facilitates geographically locating the communication device 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the WI-FI transceiver 813 detects the beacon of the access point. A SIP client 840 enables the communication device 800 to support SIP protocols and register the subscriber with the SIP registrar server. The applications 806 can also include a client 842 that provides at least the capability of discovery, play and store of multimedia content, for example, music.

The communication device 800, as indicated above related to the communication component 810, includes an indoor network radio transceiver 813 (e.g., WI-FI transceiver). This function supports the indoor radio link, such as IEEE 802.11, for the dual-mode GSM device (e.g., communication device 800). The communication device 800 can accommodate at least satellite radio services through a device (e.g., handset device) that can combine wireless voice and digital radio chipsets into a single device (e.g., single handheld device).

In some embodiments, the communication device 800 can comprise a CMAC 844 (communication management agent component) that can be associated with various components of the communication device 800 to facilitate desirable operation of, and voice and data communications by, the communication device 800. The CMAC 844 can determine and/or utilize resource blocks, an MCS value, and/or repetition of data packets based at least in part on parameter-related information (e.g., control, scheduling, and/or allocation information) received from the CMC of or associated with the communication network. The CMAC 844 can receive the parameter-related information from the CMC via a downlink communication channel (e.g., downlink control channel), and can analyze the parameter-related information, which can relate to the resource block parameter and/or the number of resource blocks to utilize for uplink transmission, the MCS parameter, the MCS value, the number of spatial streams, the modulation, and/or the coding rate to be utilized for the uplink transmission, and/or the packet repetition parameter and/or whether repetition of data packets is to be utilized for the uplink transmission, and, if so, the amount of repetition of data packets to be utilized.

Based at least in part on the results of the analysis of the parameter-related information, the CMAC 844 can determine the resource block parameter and/or the number of resource blocks allocated to the communication device 800 for the uplink transmission; the MCS parameter and/or the MCS value to be utilized for the uplink transmission, and/or the number of spatial streams, the modulation, and/or the coding rate to be utilized for the uplink transmission; and/or the packet repetition parameter and/or whether repetition of data packets is to be utilized for the uplink transmission, and, if so, the amount of repetition of data packets to be utilized. Accordingly, the CMAC 844 can control operation of the communication device 800 during the uplink transmission to utilize the allocated number of resource blocks, in accordance with the resource block parameter; to utilize the desired MCS value and the desired number of spatial streams, the desired modulation, and/or the desired coding rate, in accordance with the MCS parameter; and/or to utilize a desired amount of repetition of data packets or no repetition of data packets (as appropriate), in accordance with the packet repetition parameter.

Figure 9:
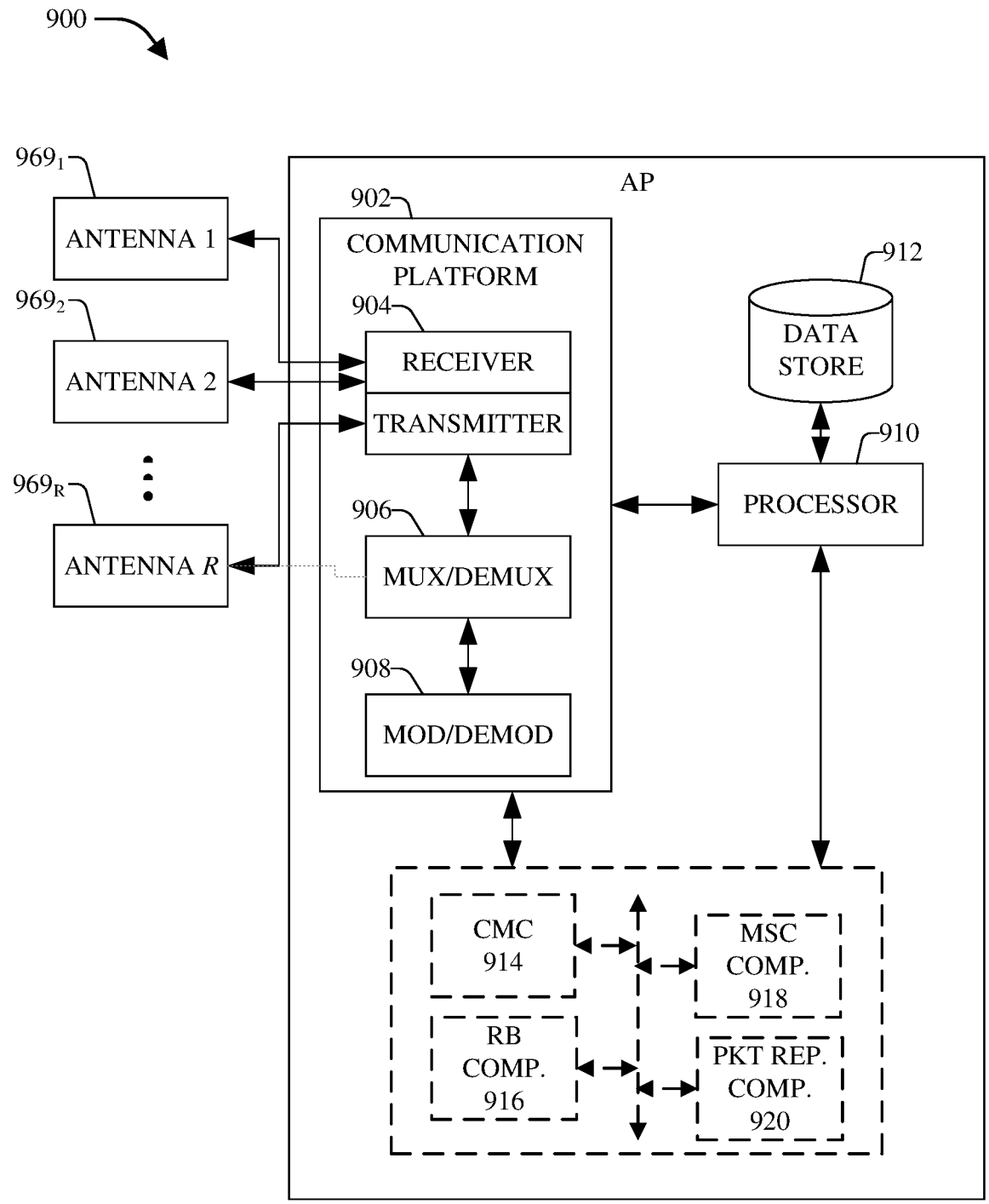
FIG. 9 illustrates a block diagram of an example access point, in accordance with various aspects and embodiments of the disclosed subject matter.

FIG. 9 illustrates a block diagram of an example AP 900 (e.g., macro base station, femto AP, pico AP, WI-FI AP, WI-FI DIRECT AP, ... ), in accordance with various aspects and embodiments of the disclosed subject matter. The AP 900 can receive and transmit signal(s) from and to wireless devices like access points (e.g., base stations, femtocells, picocells, ... ), access terminals (e.g., UEs), wireless ports and routers, and the like, through a set of antennas $969_1$-$969_R$. In an aspect, the antennas $969_1$-$969_R$ are a part of a communication platform 902, which comprises electronic components and associated circuitry that can provide for processing and manipulation of received signal(s) and signal(s) to be transmitted. In an aspect, the communication platform 902 can include a receiver/transmitter 904 that can convert signal from analog to digital upon reception, and from digital to analog upon transmission. In addition, receiver/transmitter 904 can divide a single data stream into multiple, parallel data streams, or perform the reciprocal operation.

In an aspect, coupled to receiver/transmitter 904 can be a multiplexer/demultiplexer (mux/demux) 906 that can facilitate manipulation of signal in time and frequency space. The mux/demux 906 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 906 can scramble and spread information (e.g., codes) according to substantially any code known in the art, e.g., Hadamard-Walsh codes, Baker codes, Kasami codes, polyphase codes, and so on. A modulator/demodulator (mod/demod) 908 also can be part of the communication platform 902, and can modulate information according to multiple modulation techniques, such as frequency modulation, amplitude modulation (e.g., M-ary quadrature amplitude modulation (QAM), with M a positive integer), phase-shift keying (PSK), and the like.

The AP 900 also can comprise a processor(s) 910 that can be configured to confer and/or facilitate providing functionality, at least partially, to substantially any electronic component in or associated with the AP 900. For instance, the processor(s) 910 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc.

In another aspect, the AP 900 can include a data store 912 that can store data structures; code instructions; rate coding information; information relating to measurement of radio link quality or reception of information related thereto; information relating to communication conditions (e.g., SINR, implicit NACK rate, RSRP, RSRQ, CQI, and/or other wireless communications metrics or parameters) associated with communication devices, the group of parameters (e.g., resource block parameter, MCS parameter, packet repetition parameter, and/or other desired parameter), the respective threshold values associated with the respective parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), ... ), protocols, interfaces, tools, and/or other information, etc.; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 910 can be coupled to the data store 912 in order to store and retrieve information (e.g., information, such as algorithms, relating to multiplexing/demultiplexing or modulation/demodulation; information relating to radio link levels; information relating to communication conditions (e.g., SINR, implicit NACK rate, RSRP, RSRQ, CQI, and/or other wireless communications metrics or parameters) associated with communication devices, the group of parameters (e.g., resource block parameter, MCS parameter, packet repetition parameter, and/or other desired parameter), the respective threshold values associated with the respective parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), ... ), protocols, interfaces, tools, and/or other information, etc.; ... ) desired to operate and/or confer functionality to the communication platform 902 and/or other operational components of AP 900.

In some embodiments, the AP 900 can comprise a CMC 914 that, for each communication device of one or more communication devices associated with the AP 900, can control the group of parameters (e.g., resource block parameter, MCS parameter, packet repetition parameter, and/or other desired parameter) with regard to uplink transmission associated with the communication device, in accordance with the defined communication management criteria, as more fully described herein. The CMC 914 can be the same as or similar to, and/or can comprise the same or similar functionality as, the CMC, as elsewhere described, and as more fully described, herein. The CMC 914 can be associated with the processor(s) 910 and the data store 912, wherein the processor(s) 910 can facilitate various operations on data, for example, to perform or facilitate performing operations of or associated with the CMC 914.

In accordance with various embodiments, the AP 900 also comprise a resource block component 916, MSC component 918, and packet repetition component 920. The resource block component 916, MSC component 918, and packet repetition component 920 each can be the same as or similar to, and/or can comprise the same or similar functionality as, respective components (e.g., respectively named components), as more fully described, herein.

Figure 10:
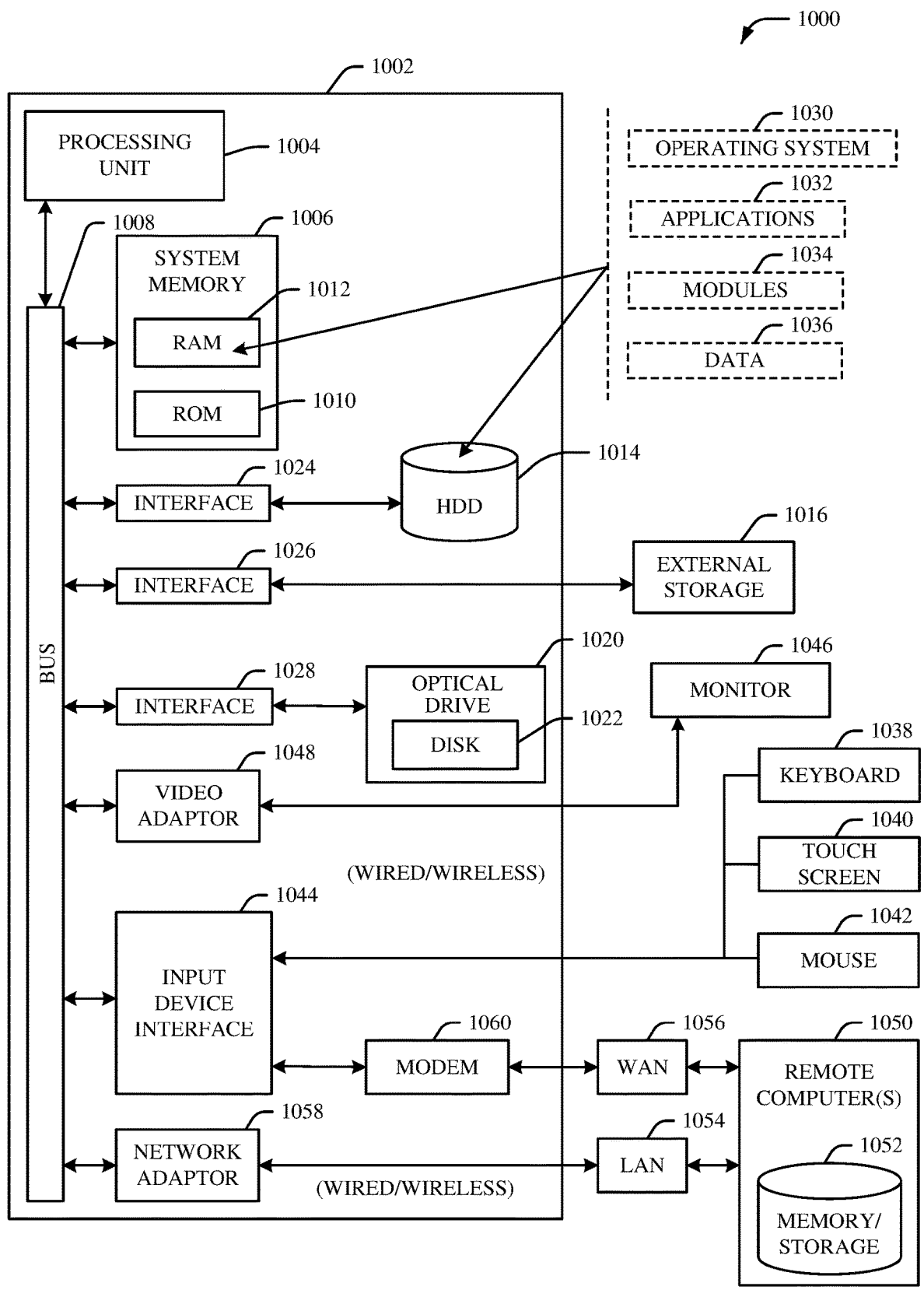
FIG. 10 illustrates an example block diagram of an example computing environment in which the various embodiments of the embodiments described herein can be implemented.

In order to provide additional context for various embodiments described herein, FIG. 10 and the following discussion are intended to provide a brief, general description of a suitable computing environment 1000 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include WI-FI and BLUETOOTH® wireless technologies. Thus, the communication can be a predefined structure as with a conventional network or simply an ad hoc communication between at least two devices.

WI-FI, or Wireless Fidelity, allows connection to the Internet from a couch at home, in a hotel room, or a conference room at work, without wires. WI-FI is a wireless technology similar to that used in a cell phone that enables such devices, e.g., computers, to send and receive data indoors and out; anywhere within the range of a base station. WI-FI networks use radio technologies called IEEE 802.11 (a, b, g, etc.) to provide secure, reliable, fast wireless connectivity. A WI-FI network can be used to connect computers to each other, to the Internet, and to wired networks (which use IEEE 802.3 or Ethernet). WI-FI networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like can refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, WI-FI, global system for mobile communications (GSM), universal mobile telecommunications system (UMTS), WIMAX, enhanced general packet radio service (enhanced GPRS), third generation partnership project (3GPP) long term evolution (LTE), third generation partnership project 2 (3GPP2) ultra mobile broadband (UMB), high speed packet access (HSPA), Z-WAVE, ZIGBEE and other 802.XX wireless technologies and/or legacy telecommunication technologies.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of $1/3$ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not be able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a system comprising a processor, a communication condition metric associated with an uplink communication connection based on communication-related data representative of the communication condition metric; and
   based on a result of analyzing the communication condition metric associated with the uplink communication connection and a defined threshold value relating to the communication condition metric, determining, by the system, whether to modify a number of physical resource blocks utilized for uplink transmission and modify a modulation and coding scheme value utilized for the uplink transmission;
   in response to determining that the communication condition metric does not satisfy the defined threshold value based on the result of the analyzing of the communication condition metric and the defined threshold value, determining, by the system, that at least one parameter value is to be modified for the uplink transmission to facilitate enhancing the communication condition metric; and
   modifying, by the system, at least the one parameter value associated with the uplink transmission; and
   wherein the modifying of at least the one parameter value for the uplink transmission occurred at a first time, wherein the defined threshold value is a first threshold value, and wherein the method further comprises:
   subsequent to the first time, determining, by the system, whether the communication condition metric has satisfied an applicable threshold value for a defined period of time, wherein the applicable threshold value is a first threshold value or a second threshold value relating to the communication condition metric; and
   in response to determining that the communication condition metric has satisfied the applicable threshold value for the defined period of time, increasing, by the system, at least the one parameter value for the uplink transmission, wherein the increasing comprises increasing the number of the physical resource blocks or the modulation and coding scheme value.

2. The method of claim 1, wherein the communication condition metric is a signal-to-interference-plus-noise ratio associated with a device, an implicit negative acknowledgement rate associated with the uplink transmission, a reference signal received power associated with the device, a reference signal received quality associated with the device, or a channel quality indicator associated with the device.

3. The method of claim 1, further comprising:
   in response to determining that the number of physical resource blocks and the modulation and coding scheme value utilized for the uplink transmission cannot be changed, modifying an amount of repetition of the transmission of data packets during the uplink transmission.

4. The method of claim 1, wherein at least the one parameter value comprises the number of the physical resource blocks, and wherein the method further comprises:
   in response to determining that the communication condition metric does not satisfy the defined threshold value based on the result of the analyzing, determining, by the system, that the number of the physical resource blocks is to be reduced for the uplink transmission.

5. The method of claim 1, wherein at least the one parameter value comprises the modulation and coding scheme value, and wherein the method further comprises:
in response to determining that the communication condition metric does not satisfy the defined threshold value based on the result of the analyzing, determining, by the system, that the modulation and coding scheme value is to be reduced for the uplink transmission.

6. The method of claim 3, further comprising determining the amount of repetition of the transmission of data packets during the uplink transmission cannot be modified.

7. The method of claim 1, wherein at least the one parameter value comprises the number of the physical resource blocks, the modulation and coding scheme value, or an amount of a repetition of a transmission of data packets during the uplink transmission, and wherein the method further comprises:
at a second time, determining, by the system, that the communication condition metric does not satisfy the defined threshold value;
determining, by the system, whether the number of the physical resource blocks utilized for the uplink transmission is at a minimum threshold number of physical resource blocks;
determining, by the system, whether the modulation and coding scheme value is at a minimum threshold modulation and coding scheme value; and
in response to determining that the communication condition metric does not satisfy the defined threshold value, in response to determining that the number of the physical resource blocks is at the minimum threshold number of the physical resource blocks, and in response to determining that the modulation and coding scheme value is at the minimum threshold modulation and coding scheme value, increasing, by the system, the amount of the repetition of the transmission of a first data packet of the data packets during the uplink transmission.

8. The method of claim 7, wherein the method further comprises:
subsequent to the second time, determining, by the system, whether the communication condition metric has satisfied the applicable threshold value for the defined period of time; and
in response to determining that the communication condition metric has satisfied the applicable threshold value for the defined period of time, decreasing, by the system, the amount of the repetition of the transmission of the data packets, comprising a second data packet, during the uplink transmission.

9. The method of claim 7, further comprising:
subsequent to the second time, determining, by the system, whether the amount of the repetition of the transmission of the data packets during the uplink transmission has satisfied a defined maximum threshold amount of data packet transmission repetition; and
in response to determining that the communication condition metric does not satisfy the defined threshold value, in response to determining that the number of the physical resource blocks is at the minimum threshold number of the physical resource blocks, in response to determining that the modulation and coding scheme value is at the minimum threshold modulation and coding scheme value, and, in response to determining that the amount of the repetition of the transmission of the data packets during the uplink transmission has satisfied the defined maximum threshold amount, determining, by the system, that the amount of the repetition of the transmission of the data packets is not to be increased with respect to the uplink transmission.

10. The method of claim 7, wherein the amount of the repetition is a first amount, and wherein the method further comprises:
determining, by the system, a difference between the communication condition metric and the defined threshold value; and
based on the difference, adaptively adjusting, by the system, a second amount of change in the first amount of the repetition of the transmission of the data packets during the uplink transmission.

11. The method of claim 7, wherein the data packets comprise an acknowledgement message or a negative acknowledgement message, and wherein the method further comprises:
applying, by the system, a tag to the acknowledgement message or the negative acknowledgement message, wherein the tag indicates a downlink transmission to which the repetition of the acknowledgement message or the negative acknowledgement message applies.

12. The method of claim 1, further comprising:
determining, by the system, a difference between the communication condition metric and the defined threshold value; and
based on the difference, adaptively adjusting, by the system, a first amount of change in a first number of the physical resource blocks utilized for the uplink transmission or a second amount of change to the modulation and coding scheme value associated with the uplink transmission.

13. A system, comprising:
a processor; and
a memory that stores executable instructions that, when executed by the processor, facilitate performance of operations, comprising:
obtaining communication-related data representative of a communication condition metric of an uplink transmission;
based on the communication condition metric and a defined threshold value relating to the communication condition metric, determining whether to adjust a number of physical resource blocks utilized for the uplink transmission and whether to adjust a modulation and coding scheme value utilized for the uplink transmission;
in response to determining that the communication condition metric does not satisfy the defined threshold value, determining that at least one parameter value is to be adjusted for the uplink transmission to facilitate improving the communication condition metric;
adjusting at least the one parameter value for the uplink transmission; and
wherein the adjusting of at least the one parameter value for the uplink transmission occurred at a first time, wherein the defined threshold value is a first threshold value, and wherein the operations further comprises:
after the first time, determining whether the communication condition metric has satisfied an applicable threshold value for a defined period of time, wherein the applicable threshold value is a first threshold value or a second threshold value relating to the communication condition metric; and in response to determining that the communication condition metric has satisfied the applicable threshold value for the defined period of time, increasing, by the system, at least the one parameter value for the uplink transmission, wherein the increasing comprises increasing the number of the physical resource blocks or the modulation and coding scheme value.

14. The system of claim 13, wherein the communication condition metric is a signal-to-interference-plus-noise ratio associated with a user equipment, an implicit negative acknowledgement rate associated with the user equipment, a reference signal received power associated with the user equipment, a reference signal received quality associated with the user equipment, or a channel quality indicator associated with the user equipment.

15. The system of claim 13, wherein the operations further comprise:

in response to determining that the number of physical resource blocks and the modulation and coding scheme value utilized for the uplink transmission cannot be changed, modifying an amount of repetition of the transmission of data packets during the uplink transmission.

16. The system of claim 15, wherein further comprising determining the amount of repetition of the transmission of data packets during the uplink transmission cannot be modified.

17. The system of claim 13, wherein at least the one parameter value comprises the number of the physical resource blocks or the modulation and coding scheme value, and wherein the operations further comprise:

in response to determining that the communication condition metric does not satisfy the defined threshold value:

determining that the number of the physical resource blocks is to be reduced for the uplink transmission; or determining that the modulation and coding scheme value is to be reduced for the uplink transmission.

18. The system of claim 13, wherein at least the one parameter value comprises the number of the physical resource blocks, the modulation and coding scheme value, or an amount of a repetition of a transmission of data packets during the uplink transmission, and wherein the operations further comprise:

at a second time, determining that the communication condition metric does not satisfy the defined threshold value;

determining whether the number of the physical resource blocks utilized for the uplink transmission is at a minimum threshold number of physical resource blocks;

determining whether the modulation and coding scheme value is at a minimum threshold modulation and coding scheme value; and in response to determining that the communication condition metric does not satisfy the defined threshold value, in response to determining that the number of the physical resource blocks is at the minimum threshold number of the physical resource blocks, and in response to determining that the modulation and coding scheme value is at the minimum threshold modulation and coding scheme value, increasing the amount of the repetition of the transmission of a first data packet of the data packets during the uplink transmission.

19. A non-transitory machine-readable medium, comprising executable instructions that, when executed by a processor, facilitate performance of operations, comprising:

accessing communication-related data representative of a communication quality value of an uplink communication connection; and based on the communication quality value and a defined threshold value relating to the communication quality value, determining whether to modify a number of resource blocks utilized for the uplink communication connection and whether to modify a modulation and coding scheme value utilized for the uplink communication connection;

in response to determining that the communication condition metric does not satisfy the defined threshold value based on a result of analyzing of the communication condition metric and the defined threshold value, determining that at least one parameter value is to be modified for uplink transmission to facilitate enhancing the communication condition metric; and modifying at least the one parameter value associated with the uplink transmission; and wherein the modifying of at least the one parameter value for the uplink transmission occurred at a first time, wherein the defined threshold value is a first threshold value, and wherein the operations further comprise:

subsequent to the first time, determining whether the communication condition metric has satisfied an applicable threshold value for a defined period of time, wherein the applicable threshold value is a first threshold value or a second threshold value relating to the communication condition metric; and in response to determining that the communication condition metric has satisfied the applicable threshold value for the defined period of time, increasing at least the one parameter value for the uplink transmission, wherein the increasing comprises increasing the number of physical resource blocks or the modulation and coding scheme value.

20. The non-transitory machine-readable medium of claim 19, wherein the operations further comprise:

in response to determining that the communication quality value does not satisfy the defined threshold value based on the result of analyzing the communication condition metric and the defined threshold value, determining that at least the one parameter value is to be modified for the uplink communication connection to facilitate improving the communication quality value; and modifying at least the one parameter value for the uplink communication connection, wherein at least the one parameter value comprises the number of the physical resource blocks, the modulation and coding scheme value, or an amount of a repetition of a transmission of data packets during an uplink transmission via the uplink communication connection.

* * * * *